(12) United States Patent
Kim et al.

(10) Patent No.: US 11,211,048 B2
(45) Date of Patent: Dec. 28, 2021

(54) METHOD FOR SENSING END OF SPEECH, AND ELECTRONIC APPARATUS IMPLEMENTING SAME

(71) Applicant: Samsung Electronics Co., Ltd., Suwon-si (KR)

(72) Inventors: Yong Ho Kim, Seoul (KR); Sourabh Pateriya, Bangalore (IN); Sunah Kim, Seongnam-si (KR); Gahyun Joo, Suwon-si (KR); Sang-Woong Hwang, Yongin-si (KR); Say Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 16/478,702

(22) PCT Filed: Nov. 23, 2017

(86) PCT No.: PCT/KR2017/013397
§ 371 (c)(1),
(2) Date: Jul. 17, 2019

(87) PCT Pub. No.: WO2018/135743
PCT Pub. Date: Jul. 26, 2018

(65) Prior Publication Data
US 2019/0378493 A1 Dec. 12, 2019

(30) Foreign Application Priority Data
Jan. 17, 2017 (KR) ........................ 10-2017-0007951

(51) Int. Cl.
*G10L 15/05* (2013.01)
*G10L 15/22* (2006.01)
*G10L 15/25* (2013.01)

(52) U.S. Cl.
CPC .............. *G10L 15/05* (2013.01); *G10L 15/22* (2013.01); *G10L 15/25* (2013.01); *G10L 2015/223* (2013.01)

(58) Field of Classification Search
CPC ..... G10L 15/04; G10L 15/05; G10L 15/1822; G10L 15/22; G10L 15/25;
(Continued)

(56) References Cited

U.S. PATENT DOCUMENTS 6,873,953 B1 3/2005 Lennig
9,437,186 B1 9/2016 Liu et al.
(Continued)

FOREIGN PATENT DOCUMENTS

JP 2007-256482 A 10/2007
JP 2010-217502 A 9/2010
(Continued)

OTHER PUBLICATIONS

Baiyang Liu et al., Accurate Endpointing with Expected Pause Duration, Sep. 6, 2015, XP055302307, Retrieved from the Internet: URL:http://www.isca-speech.org/archive/interspeech_2015/papers/i15_2912.pdf retrieved on Sep. 13, 2016.
(Continued)

*Primary Examiner* — Angela A Armstrong
(74) *Attorney, Agent, or Firm* — Jefferson IP Law, LLP

(57) ABSTRACT

Provided are an apparatus and a method, a variety of embodiments of the apparatus comprising a microphone, memory, and a processor functionally connected to the microphone or memory, wherein the processor is configured to: count end-point detection (EPD) time on the basis of a voice input; when the EPD time expires, determine whether the final word of the voice input corresponds to a previously configured word stored in memory; and, if the final word corresponds to the previously configured word, then extend
(Continued)

the EPD time and wait for reception of a voice input. Additionally, other embodiments are possible.

18 Claims, 19 Drawing Sheets

(58) Field of Classification Search
CPC ......... G10L 2015/088; G10L 2015/223; G10L 25/87; G10L 15/08; G10L 15/26; G10L 21/04; G06K 9/00
See application file for complete search history.

(56) References Cited

U.S. PATENT DOCUMENTS

| | | | |
|---|---|---|---|
| 10,339,917 B2* | 7/2019 | Aleksic | G10L 15/18 |
| 10,339,918 B2* | 7/2019 | Hofer | G10L 15/07 |
| 2007/0225982 A1 | 9/2007 | Washio | |
| 2010/0277579 A1 | 11/2010 | Cho et al. | |
| 2013/0325475 A1 | 12/2013 | Chung et al. | |
| 2014/0028826 A1* | 1/2014 | Lee | G10L 25/87 |
| | | | 348/77 |
| 2016/0351196 A1* | 12/2016 | Fanty | G10L 15/1815 |
| 2017/0110116 A1* | 4/2017 | Tadpatrikar | G06F 16/685 |
| 2017/0110144 A1* | 4/2017 | Sharifi | G06F 21/32 |
| 2017/0213569 A1* | 7/2017 | Jang | G10L 15/04 |

FOREIGN PATENT DOCUMENTS

| | | |
|---|---|---|
| JP | 2011-257529 A | 12/2011 |
| KR | 10-2010-0119250 A | 11/2010 |
| KR | 10-2013-0134620 A | 12/2013 |
| KR | 10-2014-0014812 A | 2/2014 |
| KR | 10-2015-0015703 A | 2/2015 |
| WO | 2016/191352 A1 | 12/2016 |

OTHER PUBLICATIONS

Carbini S et al., From a Wizard of Oz experiment to a real time speech and gesture multimodal interface, Signal Processing, Elsevier Science Publishers B.V. Amsterdam, NL, vol. 86, No. 12, XP024997691, retrieved on Dec. 1, 2006.

European Search Report dated Mar. 6, 2020, issued in European Application No. 17892640.8.

Indian Office Action dated Apr. 5, 2021, issued in Indian Application No. 201927032896.

* cited by examiner

METHOD FOR SENSING END OF SPEECH, AND ELECTRONIC APPARATUS IMPLEMENTING SAME

CROSS-REFERENCE TO RELATED APPLICATION(S)

This application is a U.S. National Stage application under 35 U.S.C. § 371 of an International application number PCT/KR2017/013397, filed on Nov. 23, 2017, which is based on and claimed priority of a Korean patent application number 10-2017-0007951, filed on Jan. 17, 2017, in the Korean Intellectual Property Office, the disclosure of which is incorporated by reference herein in its entirety.

TECHNICAL FIELD

Various embodiments relate to a method and an apparatus for sensing an end of speech.

BACKGROUND ART

With the recent enhancement of digital technology, various types of electronic devices such as mobile communication terminals, personal digital assistants (PDAs), electronic schedulers, smartphones, tablet personal computers (PCs), wearable devices, or the like are widely used. To support and increase functions of these electronic devices, hardware parts and/or software parts of the electronic devices are continuously developing.

Electronic devices are providing various services (or functions) using speech recognition technology. The speech recognition technology includes, for example, technology for converting an acoustic speech signal obtained by an electronic device through a sound sensor such as a microphone into a word or a sentence. The speech recognition technology generally performs the operation of removing a noise after extracting an acoustic speech signal, and then performs speech recognition by extracting features of the acoustic speech signal and comparing the features with a voice model database (DB). The electronic devices are providing various voice services (or voice recognition services) based on the speech recognition technology. According to an embodiment, electronic devices are providing various life convenience services such as mobile search, schedule management, calling, memo, or music play, based on users' voice commands.

DISCLOSURE OF INVENTION

Technical Problem

An electronic device may activate (operate) a voice service in various interaction methods. For example, the interaction method for activating the voice service may be at least one of a touch wake-up method, a voice wake-up method or push to talk, and a gesture or face/eye tracking wake-up method. Most of the voice services that do not use the push to talk method use an end point detection (EPD) method. The EPD method may refer to detecting an end of a user's voice input. For example, if it is determined that an intensity of a voice of a user is less than or equal to a threshold value for more than a predetermined time, the electronic device may recognize that user's speech is ended and may transmit recognized information to a server (for example, a voice recognition server) to process the information. Alternatively, if a user input is not received within a predetermined time (for example, 3 seconds, 5 seconds) after a microphone is turned on, the electronic device may determine that the user intends to end a voice input, and may not receive a voice input. However, when the EPD is used only with time or acoustic speech information, the electronic device may not receive a voice input or may terminate a voice service even if the user does not want to end the voice input.

Various embodiments provide a method and an apparatus which analyze a user's intent to end (or complete) speech in various methods, such as using a context (or state) of an electronic device, characteristics of the user, a predetermined word (for example, an empty word, a conjunction, a waiting instruction, etc.) or a predetermined gesture, and determine whether a voice input is ended.

Solution to Problem

According to various embodiments, an electronic device may include: a microphone; a memory; and a processor functionally connected with the microphone or the memory, and the processor may be configured to count an EPD time based on a voice input, to determine whether a last word of the voice input corresponds to a predetermined word stored in the memory when the EPD time expires, and to extend the EPD time when the last word corresponds to the predetermined word, and to wait for reception of a voice input.

According to various embodiments, an operation method of an electronic device may include: counting an EPD time based on a voice input; when the EPD time expires, determining whether a last word of the voice input corresponds to a predetermined word stored in a memory; and, when the last word corresponds to the predetermined word, extending the EPD time and waiting for reception of a voice input.

Advantageous Effects of Invention

According to various embodiments, a user's intent to end (or complete) speech can be analyzed in various determination methods, such as using a context (or state) of an electronic device, characteristics of the user, a predetermined word (for example, an empty word, a conjunction, a waiting instruction, etc.) or a predetermined gesture, and it can be determined whether a voice input is ended.

According to various embodiments, when a user hesitates because the user does not think of an exact word, a user's intent is not clear, or the user does not know what function can be performed by a voice service, user convenience can be enhanced by understanding a user's intent to end speech and extending an EPD time until a user's voice input is completed.

According to various embodiments, the electronic device does not end voice service or does not stop voice recognition (for example, reception of a voice input) while a user is speaking, and waits until a user inputs a voice, such that a more comfortable dialogue experience of a voice service can be provided.

According to various embodiments, common words (or language) corresponding to all users or personal words (or language) specified for a user through learning are collected, such that a user's intent to end speech can be more exactly determined based on the common words and the personal words.

According to various embodiments, a user's intent to end speech can be more exactly determined by changing an EPD time or an EPD extension time according to characteristics of an application that the user wishes to execute to receive a voice service or personal characteristics of the user.

BEST MODE FOR CARRYING OUT THE INVENTION

Figure 1:
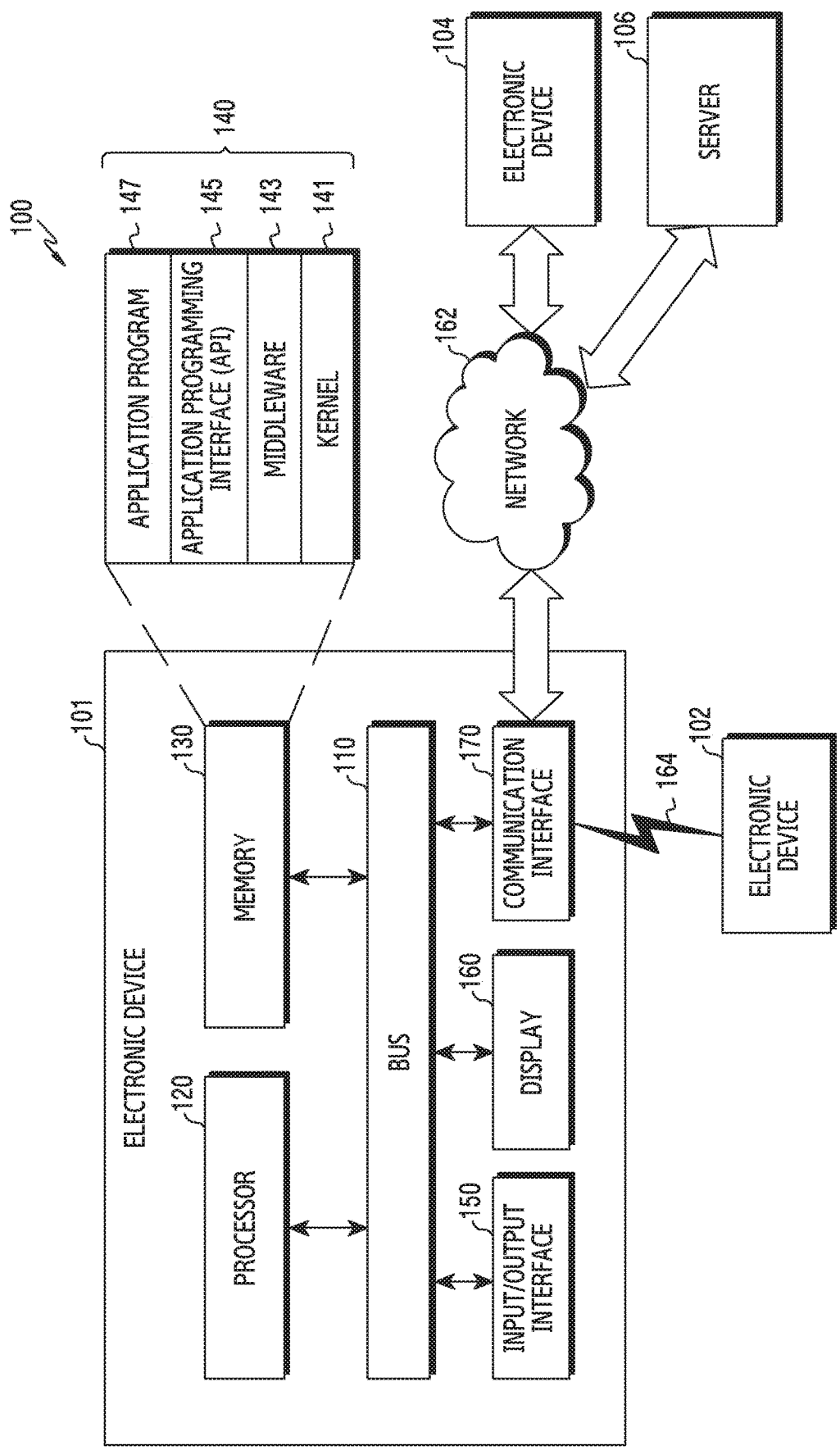
FIG. 1 is a view illustrating an electronic device in a network environment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. Singular forms may include plural forms as well unless the context clearly indicates otherwise. In the present disclosure, the expression "A or B" or "at least one of A or/and B" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being (operatively or communicatively) "connected," or "coupled," to another element (e.g., second element), it may be directly connected or coupled directly to the other element or any other element (e.g., third element) may be interposer between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology. Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data. In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program. The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106). The wireless communication may include, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. According to an embodiment, the wireless communication may include, for example, at least one of Wi-Fi, Bluetooth, Bluetooth low energy (BLE), Zigbee, Near Field Communication (NFC), magnetic secure transmission, radio frequency, or body area network (BAN).

The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

The server 106, for example, includes at least one of a voice processing server, a voice recognition server, a voice service providing server, a data server, a searching server, a settlement server, a card company server, a bank server, an authentication server, an application server, a management server, an integration server, a provider server (or communication operator server), a content server, an internet server, or cloud server.

Figure 2:
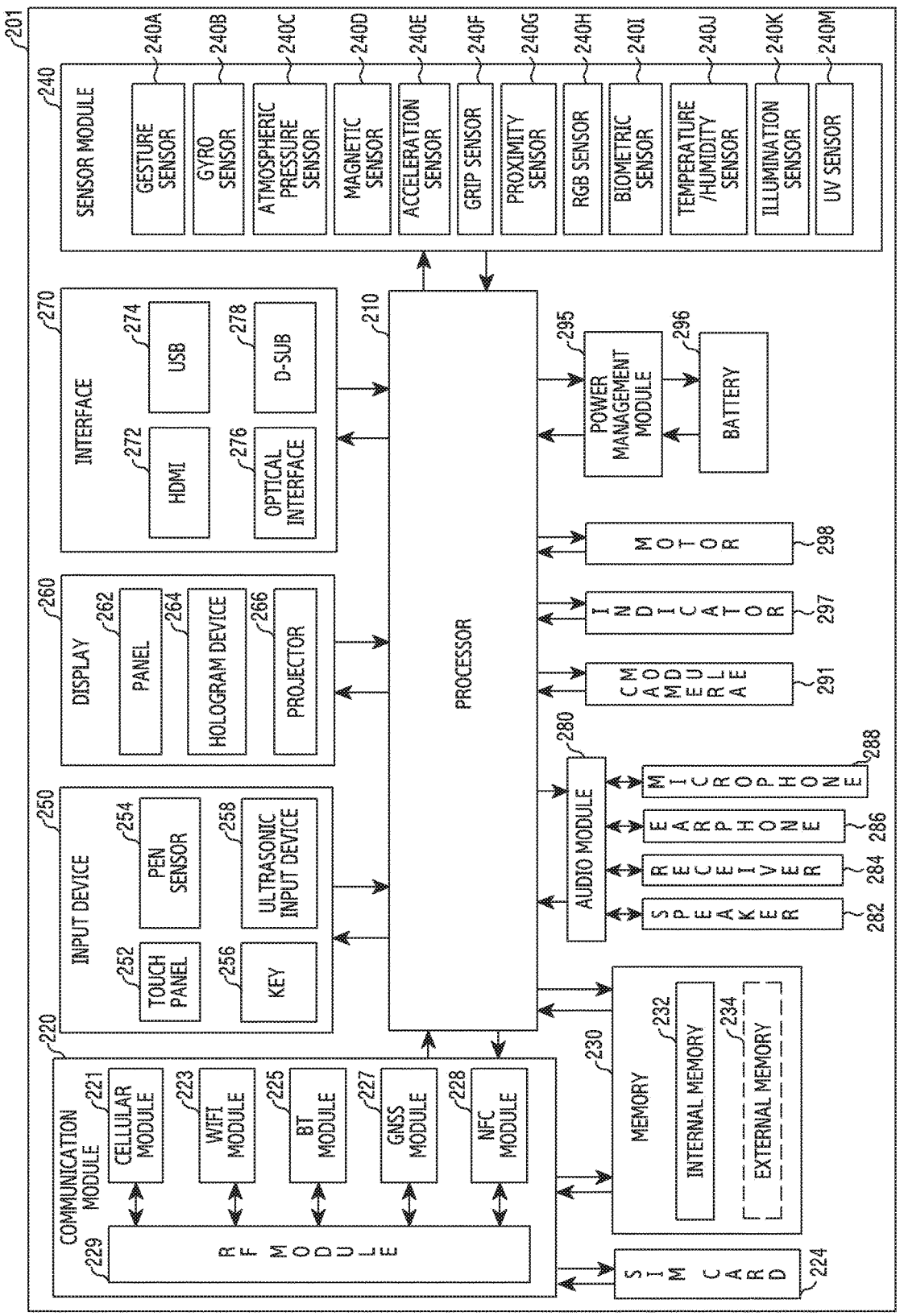
FIG. 2 is a block diagram illustrating a configuration of an electronic device according to various embodiments.

FIG. 2 is a block diagram illustrating an electronic device according to various embodiments of the present disclosure.

FIG. 2 is a block diagram of an electronic device 201 according to various embodiments. For example, the electronic apparatus 201 may include the whole or part of the electronic apparatus 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229. The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module.

The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266. The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like. The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™ Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
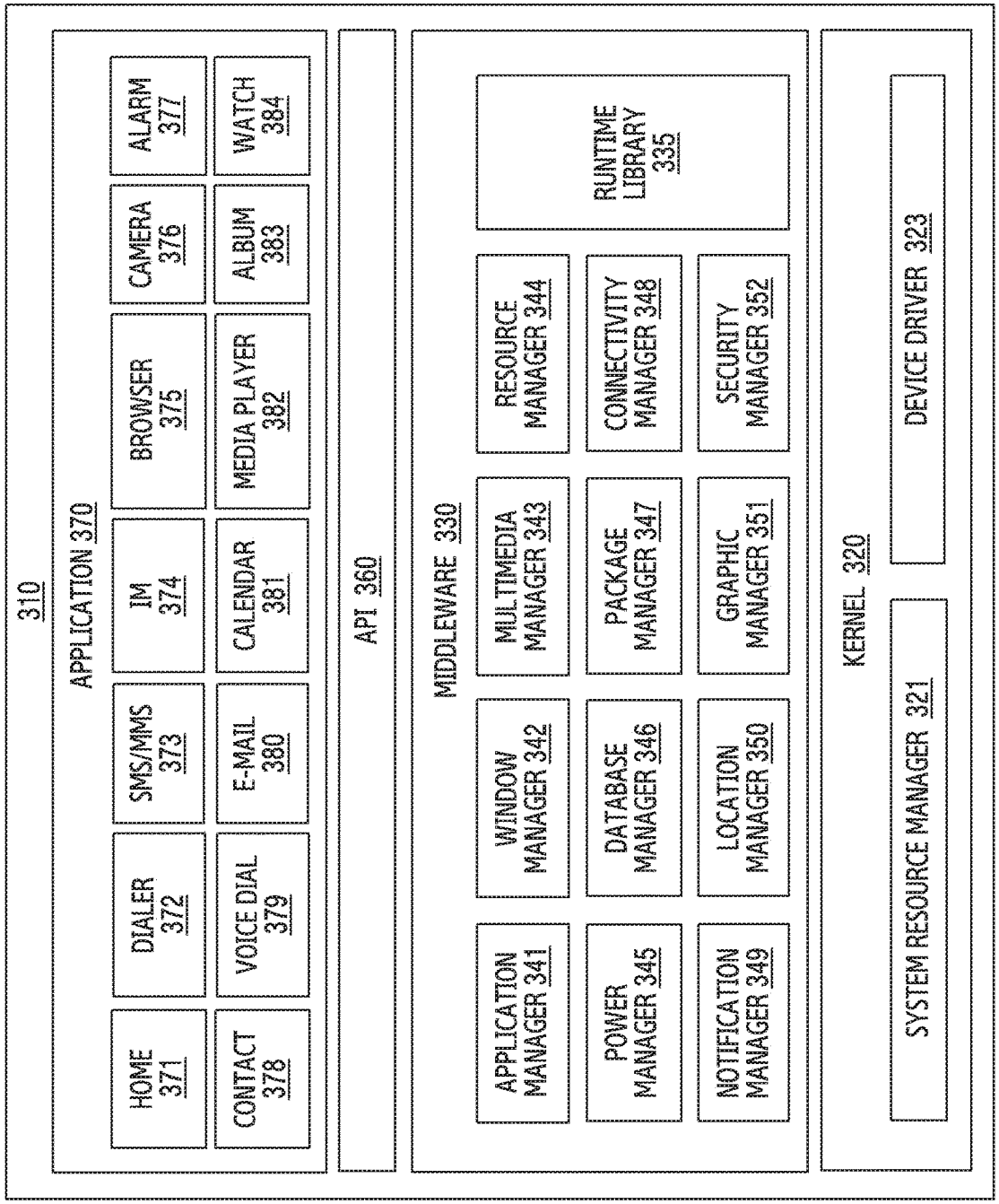
FIG. 3 is a block diagram illustrating a program module according to various embodiments.

FIG. 3 is a block diagram of a program module according to various embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like. The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like. The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format.

The resource manager 344 may manage resources, such as a source code, a memory, a storage space, and the like of at least one of the applications 370. The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like.

According to an embodiment of the present disclosure, when the electronic apparatus (e.g., the electronic apparatus 101) has a telephone call function, the middleware 330 may further include a telephony manager for managing a voice call function or a video call function of the electronic apparatus. The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements. The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information). According to an embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user. The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service). According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS. According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware and the "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. According to various example embodiments, at least part of a device (e.g. modules or functions thereof) or a method is embodied as commands which are stored in a computer-readable recording medium (e.g. memory (130)) in a form of a program module. If the commands are executed by a processor (e.g. processor (120)), the processor performs functions corresponding to the commands.

Figure 4:
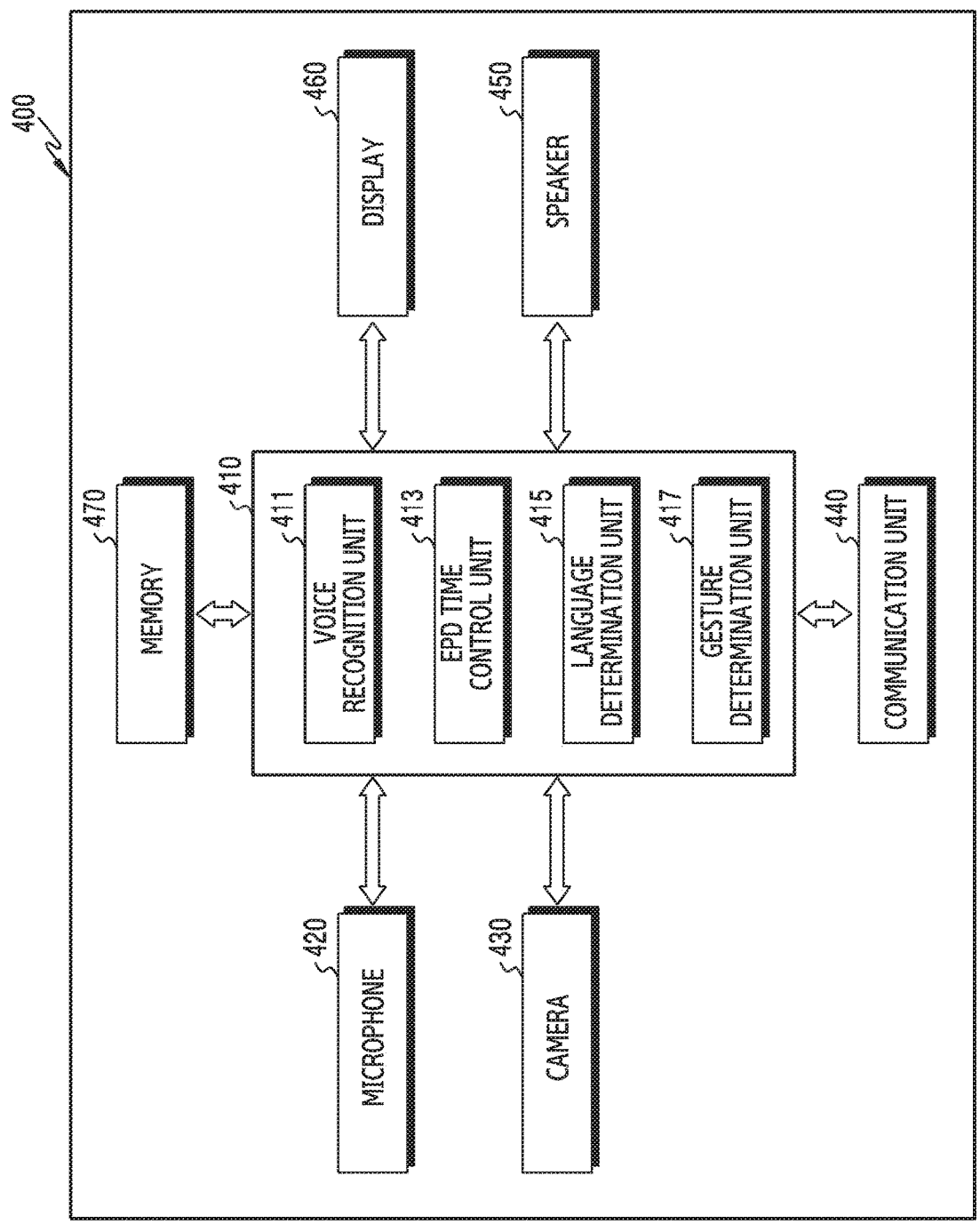
FIG. 4 is a view schematically illustrating a configuration of an electronic device according to various embodiments.

FIG. 4 is a view schematically illustrating a configuration of an electronic device according to various embodiments.

Referring to FIG. 4, the electronic device 400 may include a processor 410, a microphone 420, a camera 430, a communication unit 440, a speaker 450, a display 460, and a memory 470. Since elements illustrated in FIG. 4 are not essential elements, the electronic device 400 according to various embodiments may be implemented to include more elements or fewer elements than in FIG. 4.

The processor 410 may perform roles of detecting a voice, recognizing the detected voice, and performing a function corresponding to the recognized voice. When a voice input is received from a user, the processor 410 may count an EPD time, and, when the EPD time expires, the processor 410 may analyze a user's intent to end speech and may determine that the voice input is completed, and may provide a voice service corresponding to the voice input. To achieve this, the processor 410 may include a voice recognition unit 411, an EPD time control unit 413, a language determination unit 415, and a gesture determination unit 417. The voice recognition unit 411, the EPD time control unit 413, the language determination unit 417, and the gesture determination unit 417 may be included as hardware modules, or may be included as software modules.

The voice recognition unit 411 may perform roles of processing a sound inputted through the microphone 420 into a voice signal (for example, preprocessing), and recognizing a voice (for example, automatic speech recognition (ASR)). In addition, the voice recognition unit 411 may perform language processing (for example, natural language understanding (NLU), dialogue management (DM), or text to speech (TTS)) with respect to the recognized voice. The voice recognition unit 411 may operate in association with a voice processing server to process and recognize a voice. That is, the voice recognition unit 411 may transmit a voice signal to the voice processing server, and may receive voice information (or text information corresponding to voice information) from the voice processing server. The voice recognition unit 411 may transmit information regarding whether a voice is recognized (or detected), recognized voice information, or text information corresponding to voice information to the EPD time control unit 413 or the language determination unit 415. The voice recognition unit 411 may temporarily store voice information inputted through the microphone 420 for an EPD time in the memory 470 (for example, store in a buffer).

When the voice input is received from the user, the EPD time control unit 413 may count an EPD time. For example, the EPD time may be a waiting time for determining an end of the voice input. The EPD time may be interpreted as an input waiting time or a microphone recording waiting time. For example, the EPD time control unit 413 may start counting from a time at which a voice input (for example, a first voice input) is detected (or a time at which the first voice input is ended), and, when a voice input (for example, a second voice input) is detected again (or the second voice input is ended) before the EPD time expires, the EPD time control unit 413 may re-count the EPD time.

For example, when the EPD time is 5 seconds, the EDP time control unit 413 may count the EPD time from the time at which the first voice input is detected, and, when the second voice input is detected at a time at which the EPD time is counted up to 3 seconds, the EPD time control unit 413 may delete (disregard) the EPD time counted up to now and may re-count the EDP time from the time at which the second voice input is detected. Alternatively, when a voice input is not additionally detected within a predetermined time, the EDP time control unit 413 may count the EPD time. The predetermined time may be the same as the EPD time or may be shorter or longer than the EDP time. Alternatively, when a voice input is not additionally detected within the predetermined time, the EPD timer control unit 413 may determine that the EPD time expires.

When the EPD time expires, the EPD time control unit 413 may notify the language determination unit 415 or the gesture determination unit 417 that the EPD time expires. In addition, the EPD time control unit 413 may extend the EPD time according to a result received from the language determination unit 415 or the gesture determination unit 417.

The EPD time control unit 413 according to various embodiments may set the EPD time to be different according to a context (or state) of the electronic device 400 or characteristics of the user. In addition, the EPD time control unit 413 may adjust an extension time of the EPD time to be different according to the context (or state) of the electronic device 400 or the characteristics of the user. That is, the EPD time control unit 413 may change the EPD time or the EPD extension time according to characteristics of an application that the user wishes to execute to receive a voice service or personal characteristics of the user. The EPD time control unit 413 according to various embodiments may set the EPD time or the EPD extension time to be different based on at least one of a time for which the user does not speak, a change in user's intonation, or a change in a speech rate of the user.

The language determination unit 415 may determine (or understand) a user's intent to end speech based on a predetermined word stored in the memory 470. For example, the language determination unit 415 may determine whether a last word inputted by speech is the predetermined word. For example, the user may hesitate since the user does not think of an exact word, user's intent is not clear, or the user does not know what function can be performed by a voice service. In this case, the user may speak the predetermined word including at least one of a meaningless word (for example, an empty word), a conjunction (for example, so, therefore, and, etc.) or a waiting instruction (for example, just a moment, Wait, etc.) in the middle of inputting a voice. However, the predetermined word may be a language that is not required for voice recognition, but may indicate a user's intent to continue inputting a voice. When the EPD time expires, but a last language spoken by the user is the predetermined word, the language determination unit 415 may control to extend the EPD time. That is, then the last word inputted is the predetermined word, the language determination unit 415 may instruct the EPD time control unit 413 to extend the EPD time. When the EPD time is extended by the EPD time control unit 413, the voice recognition unit 411 may wait for reception of a voice input without stopping receiving the voice input.

The gesture determination unit 417 may determine (or understand) a user's intent to end speech based on a predetermined gesture stored in the memory 470. The gesture determination unit 417 may determine whether a user's gesture detected from the camera 430 or a sensor (for example, a motion sensor) is the predetermined gesture. The user may make a specific gesture while thinking of a word that the user intends to speak since the user does not think of the word exactly in the middle of inputting a voice. For example, the user may look up or tilt user's head to the left or right while thinking. When the EPD time expires, but the detected user's gesture is the predetermined gesture, the gesture determination unit 417 may control to extend the EPD time. That is, when the detected user's gesture is the predetermined gesture, the gesture determination unit 417 may instruct the EPD time control unit 413 to extend the EPD time. When the EPD time is extended by the EPD time control unit 413, the voice recognition unit 411 may wait for reception of a voice input without stopping receiving the voice input.

The microphone 420 may receive an input of an external acoustic signal and may process the signal into electric voice data. In the microphone 420, various noise reduction algorithms may be implemented to remove a noise occurring in the process of receiving the input of the external acoustic signal. The microphone 420 may server to input an audio streaming such as a voice command (a voice command to activate/inactivate a voice service, etc.). The microphone 420 may be activated for the EPD time.

The camera 430 (for example, the camera module 291 of FIG. 2) may indicate a configuration for supporting a shooting function of the electronic device 400. The camera 430 may shoot a certain subject under control of the processor 410 and may transmit shot data (for example, an image) to the display 460 and the processor 410.

The communication unit 440 may have a configuration which is the same as or similar to the communication module 220 of FIG. 2. The communication unit 440 may include one or more modules enabling wireless communication between the electronic device 400 and an external device (for example, another electronic device 102, 104, a voice processing server, etc.). For example, the communication unit 440 may be configured to include a mobile communication module, a wireless local area network (LAN) module, a short range communication module, and a location calculation module. In various embodiments, the communication unit 440 may include a module for communicating with neighboring external devices (for example, a short range communication module, a long range communication module, etc.).

The speaker 450 may output audio data which is received from the communication unit 440 or stored in the memory 470. The speaker 450 may output an acoustic speech signal related to various operations (functions) performed in the electronic device 400.

The display 460 may display (output) a variety of information processed in the electronic device 400. For example, the display 460 may display various user interfaces (UIs) or graphical UIs (GUIs) related to use of the electronic device 400. According to various embodiments, the display 460 may provide various screen configurations to feedback information regarding an activation (or time out) state to the user during the voice service. The display 460 may use various displays (for example, the display 160 of FIG. 1). In various embodiments, the display 460 may use a curved display.

The memory 470 (for example, the memory 130, 230 of FIG. 1 or 2) may store one or more programs executed by the processor 410, and may perform a function for temporarily storing inputted/outputted data (for example, buffering). The inputted/outputted data may include, for example, a video, an image, a photo, or an audio. The memory 470 may store at least one of a predetermined word (for example, a common word, a personal word), a predetermined gesture, a weight value or a score in each condition for analyzing an intent to end speech, an EPD time according to a context of the electronic device or personal characteristics, and an EPD extension time according to the context of the electronic device or personal characteristics.

The predetermined word according to various embodiments may be a common word which is generally used or a word which set to be different according to characteristics of the user unlike the common word. The common word may vary by country (for example, according to language characteristics of each country). The memory 470 may store common words of each country according to categories. Alternatively, common words stored in the memory 470 may vary according to a country where the electronic device 400 is sold.

Table 1 shows common words of each language stored in the memory 470.

TABLE 1

| Categories | Korean | English | Chinese | German |
|---|---|---|---|---|
| Empty words | 응, 은, 어, 그, 에 | Um, Ahh, well, Hmm | 这个 zhe ge, 那个 na ge . . . | ah/s:/, so/zo:/, tja, halt, eigentlich |
| Conjunctions | 그러니까, 그래서, 그리고, 그런데 | For, And, Nor, But, Or Yet, So | 从而 cóng er (so), 但是 dánshí (but),.. 而且 érqiě (and), 反而 fǎn'ér (rather) | Und (and), aber (but), oder (or), denn (because) |
| Waiting instructions | 잠깐만, 기다려봐, 잠만 | Wait, Wait a second, Hold on | 等 ·下 děngyīxià | Entschuldigun g |

The processor 410 may continuously update personal words which are inputted differently according to characteristics of the user through learning by the electronic device 400. For example, the memory 470 may store common words and personal words as shown in table 2.

Table 2 shows common languages and personal languages stored in the memory 470.

TABLE 2

| Common DB | Personal DB | | |
|---|---|---|---|
| | User A | User B | User C |
| Yeah, Um, Well, Hum, . . . | so . . . , what it is . . . , so to speak . . . | Whatchamacallit, so, whatsit . . . | What was it . . . , and then . . . |

For example, some of the personal words of the user A using the electronic device 101, the user B using the electronic device 102, and the user C using the electronic device 104 may be similar to one another or different from one another. The processor 410 according to various embodiments may share its own personal words with other users periodically or according setting, and may update the common words by analyzing personal words of the other users. For example, the processor 410 may update words that are the same as each other among the personal words of the user A and the personal words of the user B as a common word.

According to various embodiments, gestures made while users are thinking may include general common gestures or personal gestures which vary according to characteristics of users unlike the common gestures. The personal gesture varying according to characteristics of a user may be continuously updated through learning by the electronic device 400. The predetermined gesture may vary by country (according to gesture characteristic of each country). The memory 470 may store common gestures of each country. Alternatively, common gestures stored in the memory 470 may vary according to a country where the electronic device 400 is sold.

The electronic device 400 according to various embodiments may include the microphone 420, the memory 470, and the processor 410 functionally connected with the microphone or the memory, and the processor may be configured to count an EPD time based on a voice input, to determine whether a last word of the voice input corresponds to a predetermined word stored in the memory when the EPD time expires, and to extend the EPD time when the last word corresponds to the predetermined word, and to wait for reception of a voice input.

The processor may be configured to, when the last word corresponds to a predetermined word including at least one of an empty word, a conjunction, or a waiting instruction, extend the EPD time.

The processor may be configured to, when an additional voice input is detected before the EPD time expires, extend the EPD time.

The predetermined word may include a common word and a personal word, and the processor may be configured to determine similarity between a voice command recognized after a voice command failure and a previous voice command, and to collect the personal word based on a degree of the similarity.

The processor may be configured to analyze changed text information between the voice command and the previous voice command, and, when the changed text information is detected a predetermined number of times or more, to update the text information with the personal word.

The processor may be configured to determine whether a predetermined gesture is detected when the EPD time expires, and, when the predetermined gesture is detected, to extend the EPD time.

The processor may be configured to determine whether a sentence according to the voice input is completed when the EPD time expires, and, when it is determined that the sentence is not completed, to extend the EPD time.

The processor may be configured to determine whether to perform an operation of determining whether the sentence is completed, based on a type of a voice command according to the voice input.

The processor may be configured to extend the EPD time according to a fixed value, or to change the EPD time to a value corresponding to context recognition, and to extend the EDP time according to the changed value.

The processor may be configured to determine the EPD time or an EPD extension time, based on context information of the electronic device and characteristic information of a user.

The processor may be configured to analyze a user's intent to end a speech based on at least one of context information of the electronic device, characteristic information of a user, whether an additional voice input is detected, whether a predetermined word is detected, whether a predetermined gesture is detected, or whether a sentence is completed.

The processor may be configured to give a weight value or a point to at least one of a silence detection time, whether a predetermined word is detected, whether a predetermined gesture is detected, or whether a sentence is completed, and, when an end intent index is greater than or equal to a predetermined index, to extend the EPD time.

The processor may be configured to change an EPD extension time based on the end intent index.

Figure 5A:
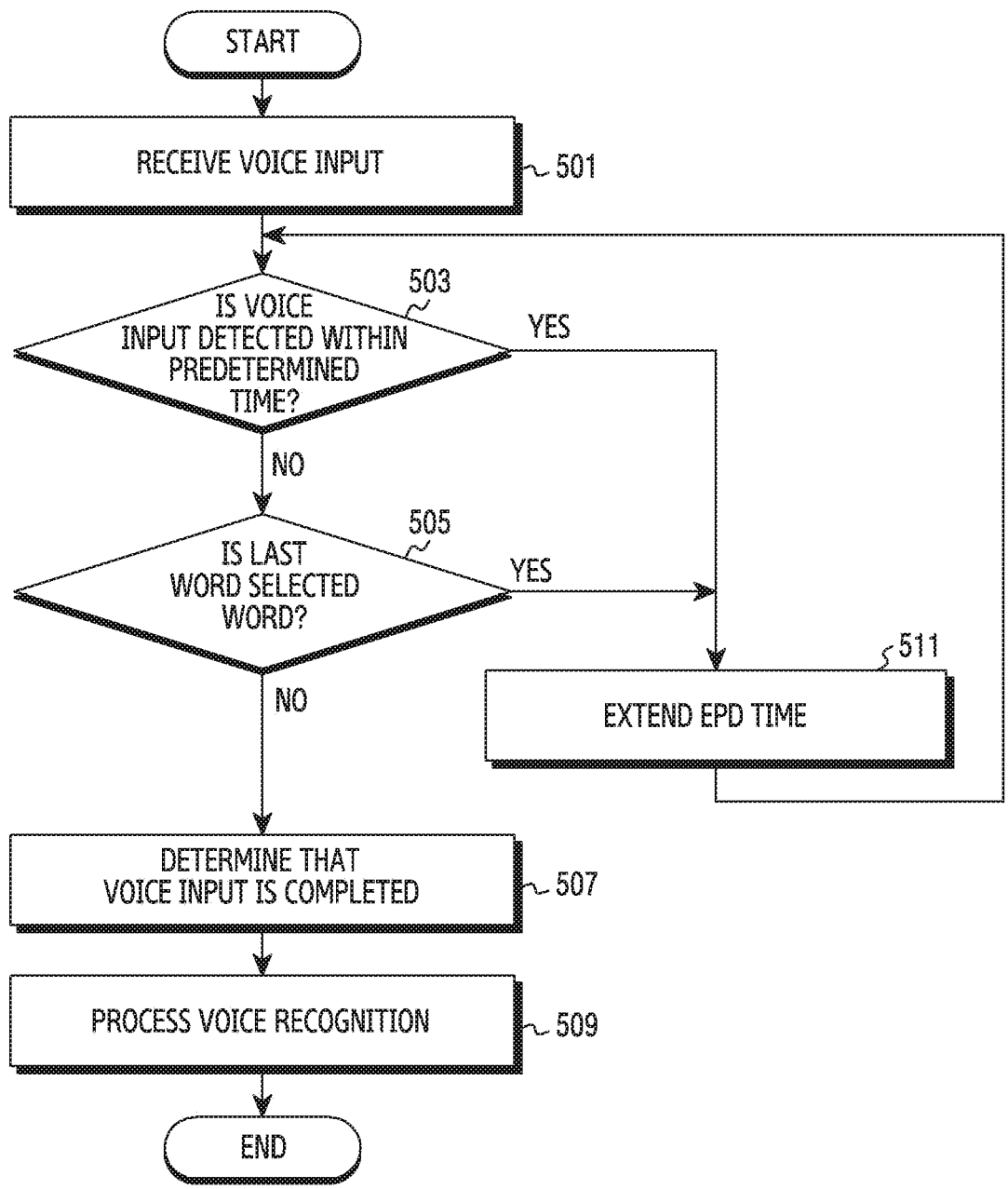
FIGS. 5A and 5B are flowcharts illustrating an operation method of the electronic device according to various embodiments.
Figure 5B:
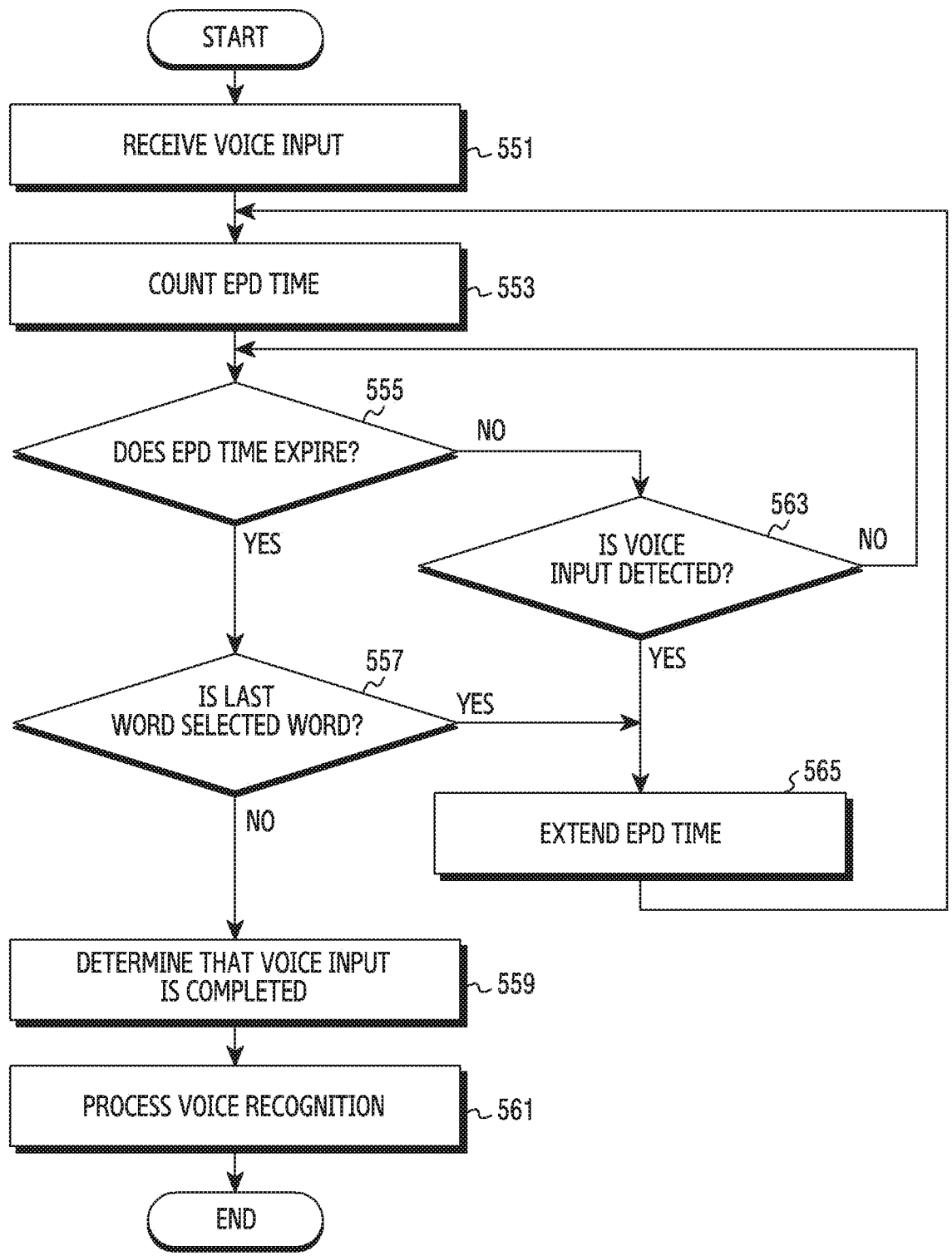

FIGS. 5A and 5B are flowcharts illustrating an operation method of the electronic device according to various embodiments.

FIG. 5A illustrates an operation method for controlling an EPD time when a voice input is not additionally detected within a predetermined time.

Referring to FIG. 5B, in operation 501, the electronic device 400 (for example, the processor 410) may receive a voice input. The processor 410 (for example, the voice recognition unit 411) may detect whether a sound is inputted from the microphone 420. The processor 410 according to various embodiments may start a voice service (for example, may activate a voice function), based on a voice wake-up method. To achieve this, the processor 410 may further include a wake-up processing unit (or a wake-up engine). According to various embodiments, the electronic device 400 may include a first processor of a low-power mode including the wake-up processor, and a second processor including the voice recognition unit 411, the EPD time control unit 413, the language determination unit 415, and the gesture determination unit 417.

According to an embodiment, the processor 410 may use a specific voice instruction (for example, a word) as a voice invoking instruction (for example, a wake-up word), and may not perform voice recognition with respect to user speech before the voice invoking instruction is inputted. The voice invoking instruction (for example, a wake-up word) may use, for example, a name of the electronic device (or an agent of the electronic device (or artificial intelligence (AI)) as the wake-up word. The user should include the voice invoking instruction for driving a voice recognition engine (for example, a voice agent) to use the voice service in the electronic device 400, and the voice invoking instruction may be referred to as a wake-up command or a wake-up word. When the voice invoking instruction is recognized, the electronic device may drive the voice recognition engine and then may recognize user's speech and provide the voice service.

According to various embodiments, the processor 410 may start the voice service based on selection of a specific button (for example, a home button) or a user input such as an input of a specific instruction. In addition, when a predetermined gesture, face or eyes for invoking the voice service are detected, the processor 410 may start the voice service. The processor 410 (for example, the voice recognition unit 411) may start the voice service, may detect a sound inputted from the microphone 420, and may perform voice signal processing. The voice signal processing refers to preprocessing for recognizing a voice, and for example, may refer to converting a sound to a voice signal. In addition, the processor 410 (for example, the voice recognition unit 411) may recognize a voice regarding the detected voice input. For example, the processor 410 (for example, the voice recognition unit 411) may process a language regarding the converted voice signal and may convert the voice signal into a text (for example, speech-to-text). Since speech recognition technology is well known, a detailed description is omitted. The processor 410 may operate the microphone 420 and may record a voice received from the microphone 420.

In operation 503, the electronic device 400 (for example, the processor 410) may determine whether a voice input is detected within a predetermined time. For example, the predetermined time may be the same as an EPD time or may be shorter or longer than the EPD time. When a voice input is not detected within the predetermined time, the processor 410 (for example, the EPD time control unit 413) may count the EPD time. Alternatively, when a voice input is not detected within the predetermined time (for example, a silence time), the processor 410 may determine that the EPD time expires. For example, when the predetermined time is not the same as the EPD time and a voice input is not detected within the predetermined time, the processor 410 may count the EPD time. Alternatively, when the predetermined time is the same as the EPD time and a voice input is not detected within the predetermined time, the processor 410 may determine that the EPD time expires. That is, when the silence time for which a voice input is not detected is the same as the EPD time, the processor 410 may determine that the EPD time expires.

When a voice input is detected within the predetermined time, the processor 410 may perform operation 511, and, when a voice input is not detected within the predetermined time, the processor 410 may perform operation 505.

When a voice input is detected within the predetermined time, the electronic device 400 (for example, the processor 410) may extend the EPD time in operation 511. When a new voice input is detected within the predetermined time, the processor 410 (for example, the EPD time control unit 413) may re-count the EPD time. The processor 410 may extend the EPD time and may return to operation 503.

When a voice input is not detected within the predetermined time, the electronic device (for example, the processor 410) may determine whether a last word is a selected word in operation 505. The last word may be an entirety or a part of voice information inputted last by the user. That is, the processor 410 may interpret text information corresponding to the last voice information, as the last word. For example, the processor 410 may determine whether the last word corresponds to a predetermined word including at least one of an empty word (for example, yeah, um, ahh, well, hmm . . . ), a conjunction (for example, so, therefore, but, etc.), or a waiting instruction (for example, wait, wait a second, hold on, etc.).

When the last word is the selected word, the processor 410 may perform operation 511, and, when the last word is not the selected word, the processor 410 may perform operation 507.

In operation 507, the electronic device 400 (for example, the processor 410) may determine that the voice input is completed. For example, when the EPD time expires and the last word is not the selected word, the processor 410 (for example, the voice recognition unit 411) may determine that the user has an intent to end the voice input. When the voice input is completed, the processor 410 may inactivate (for example, does not operate) the microphone 420. That is, the processor 410 may stop receiving a voice input. The processor 410 may stop recording a voice received from the microphone 420.

In operation 509, the electronic device 400 (for example, the processor 410) may process voice recognition. The processor 410 (for example, the voice recognition unit 411) may provide a service according to the user's voice input. For example, the processor 410 may transmit a voice file (for example, a voice signal) recording the voice received from the microphone 420 to the voice processing server, and may receive an instruction corresponding to the voice file from the voice processing server and may perform a function (for example, a voice service) corresponding to the received instruction. The processor 410 according to various embodiments may provide various functions corresponding to the recognized voice by utilizing speech recognition technology. For example, the processor 410 may provide various functions, such as mobile search, schedule management, calling, memo, or music play, based on a text converted from the voice.

FIG. 5B illustrates an operation method for controlling an EPD time according to whether a voice input is additionally detected within an EPD time.

Referring to FIG. 5B, in operation 551, the electronic device 400 (for example, the processor 410) may receive a voice input. The processor 410 (for example, the voice recognition unit 411) may detect whether a sound is inputted from the microphone 420. The processor 410 according to various embodiments may start a voice service (for example, may activate a voice function) based on a voice wake-up method.

According to various embodiments, the processor 410 may start the voice service based on selection of a specific button (for example, a home button), or a user input such as an input of a specific instruction. In addition, when a predetermined gesture, face or eyes for invoking the voice service are detected, the processor 410 may start the voice service. The processor 410 (for example, the voice recognition unit 411) may start the voice service, may detect a sound inputted from the microphone 420, and may perform voice signal processing. The processor 410 may operate the microphone 420 and record a voice received from the microphone 420.

In operation 553, the electronic device 400 (for example, the processor 410) may count an EPD time. For example, the EPD time may be a waiting time for determining that a voice input is ended. The processor 410 (for example, the EPD time control unit 413) may start counting the EPD time from a time at which a voice input (for example, an initial voice input) is detected or a time at which the voice input (for example, the initial voice input) is ended.

In operation 555, the electronic device 400 (for example, the processor 410) may determine whether the EPD time expires. The processor 410 (for example, the EPD time control unit 413) may count the EPD time and then may continuously determine whether the EPD time expires. When a new voice input is detected, the EPD time may be re-counted. The processor 410 may continuously determine whether a new voice input is detected before the EPD time expires.

When the EPD time does not expire, the processor 410 may perform operation 563, and, when the EPD time expires, the processor 410 may perform operation 557.

When the EPD time does not expire, the electronic device 400 (for example, the processor 410) may determine whether a voice input is detected in operation 563. The processor 410 (for example, the voice recognition unit 411) may determine whether a new voice input is detected before the EPD time expires.

When a voice input is detected, the processor 410 may perform operation 565, and, when a voice input is not detected, the processor 410 may return to operation 555. That is, the processor 410 may perform operation 557 or 565 by repeating determination in operation 555 and operation 563 for the EPD time.

When a voice input is detected, the electronic device 400 (for example, the processor 410) may extend the EPD time in operation 565. When a voice input is detected for the EPD time, the processor 410 (for example, the EPD time control unit 413) may re-count the EPD time. For example, when the EPD time is 3 seconds and a new voice input is detected within 3 seconds, the processor 410 may extend the EPD time by 3 seconds from a time at which the new voice input is detected. The processor 410 may extend the EPD time and return to operation 503. Accordingly, the processor 410 may repeat operation 503, 505, 513, or 515 after receiving an initial voice input.

The processor 410 according to various embodiments may set the EPD time to be different according to a context (or state) of the electronic device 400 or characteristics of the user (for example, a speech rate, a speech habit). In addition, the EPD time control unit 413 may adjust an extended time of the EPD time (for example, an EPD extension time) to be different according to the context (or state) of the electronic device 400 or characteristics of the user.

When the EPD time expires, the electronic device 400 (for example, the processor 410) may determine whether a last word is a selected word in operation 557. The last word may be an entirety or part of voice information inputted last by the user. That is, the processor 410 may interpret text information corresponding to last voice information as the last word. For example, when a voice input is not detected after the last word and the EPD time expires, the processor 410 (for example, the language determination unit 415) may determine whether the last word is a predetermined word. For example, the processor 410 may determine whether the last word corresponds to a predetermined word including at least one of an empty word (for example, yeah, um, ahh, well, hmm . . . ), a conjunction (for example, so, therefore, but, etc.), or a waiting instruction (for example, wait, wait a second, hold on, etc.).

When the last word is the selected word, the processor 410 may perform operation 565, and, when the last word is not the selected word, the processor 410 may perform operation 559.

In operation 559, the electronic device 400 (for example, the processor 410) may determine that the voice input is completed. For example, when the EPD time expires and the last word is not the selected word, the processor 410 (for example, the voice recognition unit 411) may determine that the user has an intent to end the voice input. When the voice input is completed, the processor 410 may inactivate (for example, may not operate) the microphone 420. That is, the processor 410 may stop receiving a voice input. The processor 410 may stop recording a voice received from the microphone 420.

In operation 561, the electronic device 400 (for example, the processor 410) may process voice recognition. The processor 410 (for example, the voice recognition unit 411) may provide a service according to the user's voice input. For example, the processor 410 may transmit a voice file (for example, a voice signal) recording the voice received from the microphone 420 to the voice processing server, and may receive an instruction corresponding to the voice file from the voice processing server and may perform a function (for example, a voice service) corresponding to the received instruction. The processor 410 according to various embodiments may provide various functions corresponding to the recognized voice by utilizing speech recognition technology. For example, the processor 410 may provide various functions, such as mobile search, schedule management, calling, memo, or music play, based on a text converted from the voice.

Figure 6A:
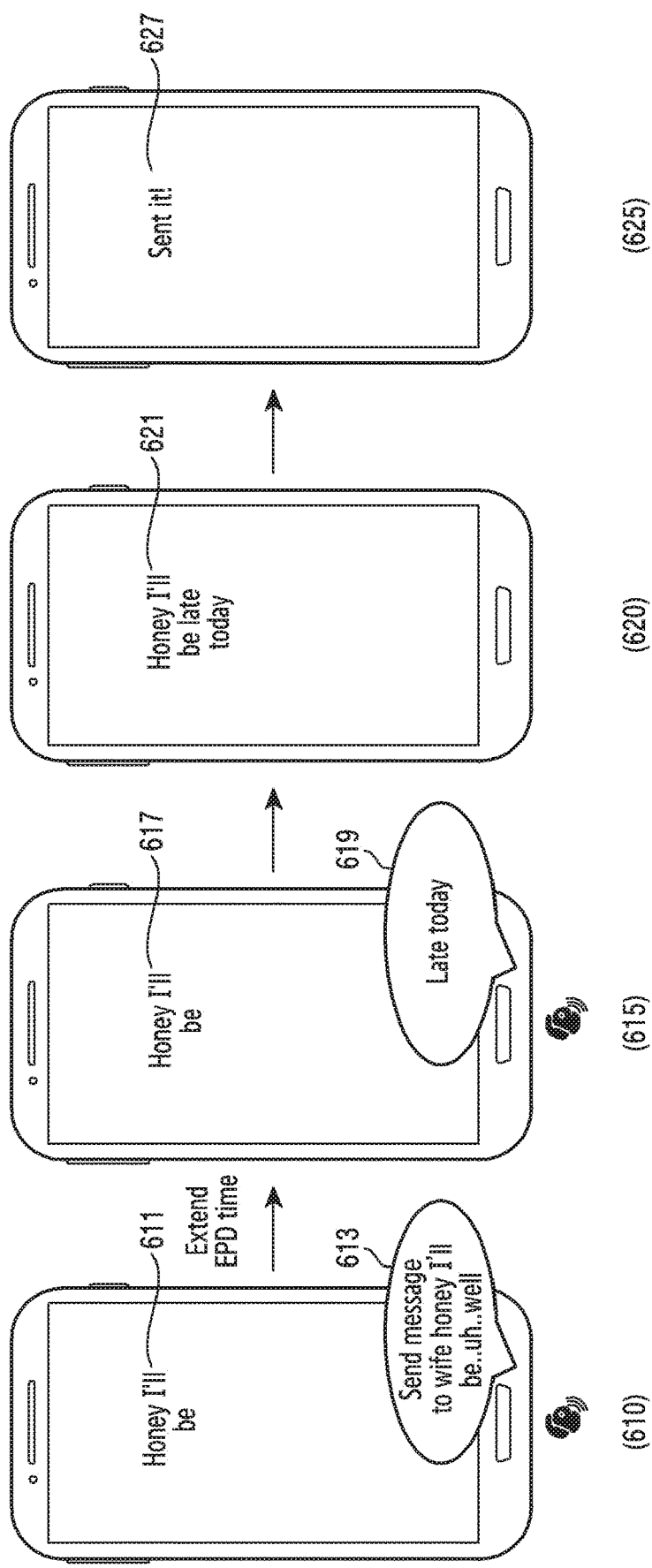
FIGS. 6A, 6B, and 6C are views illustrating examples of user interfaces according to various embodiments.
Figure 6B:
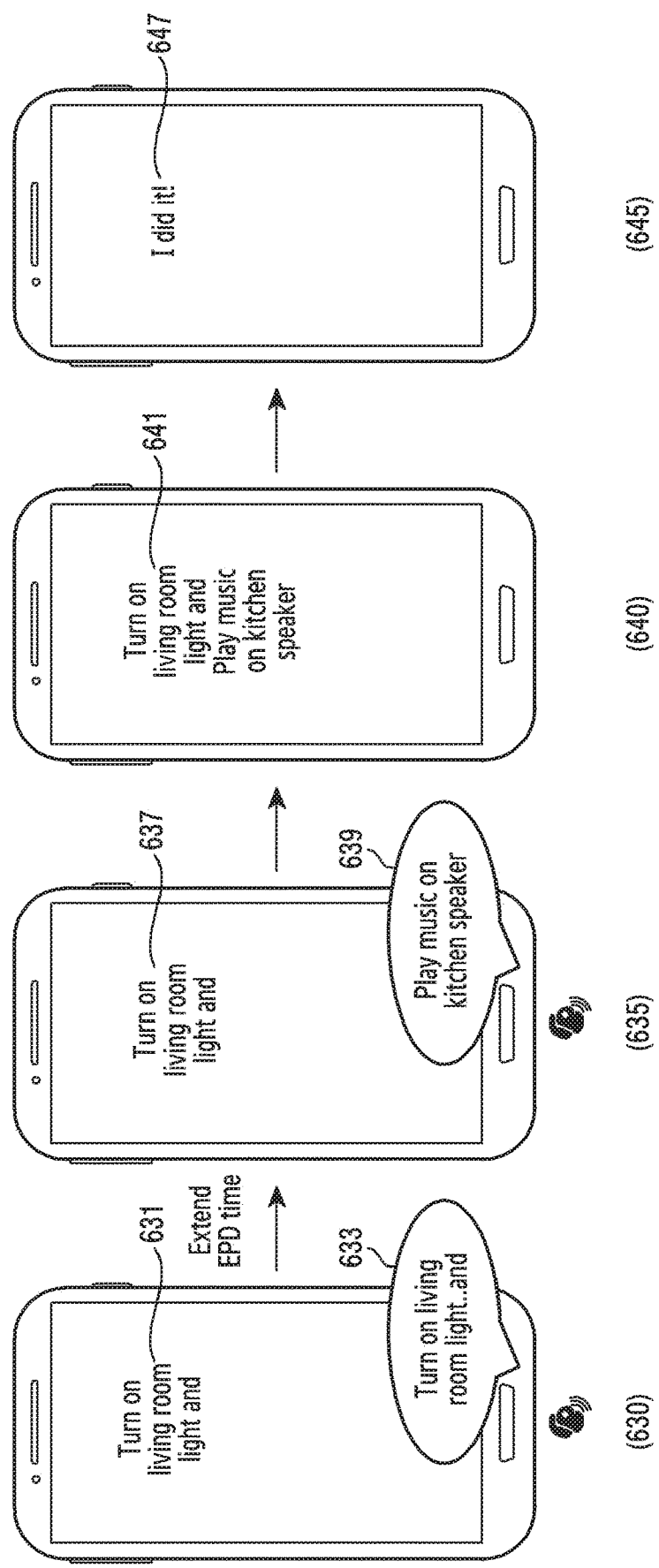
Figure 6C:
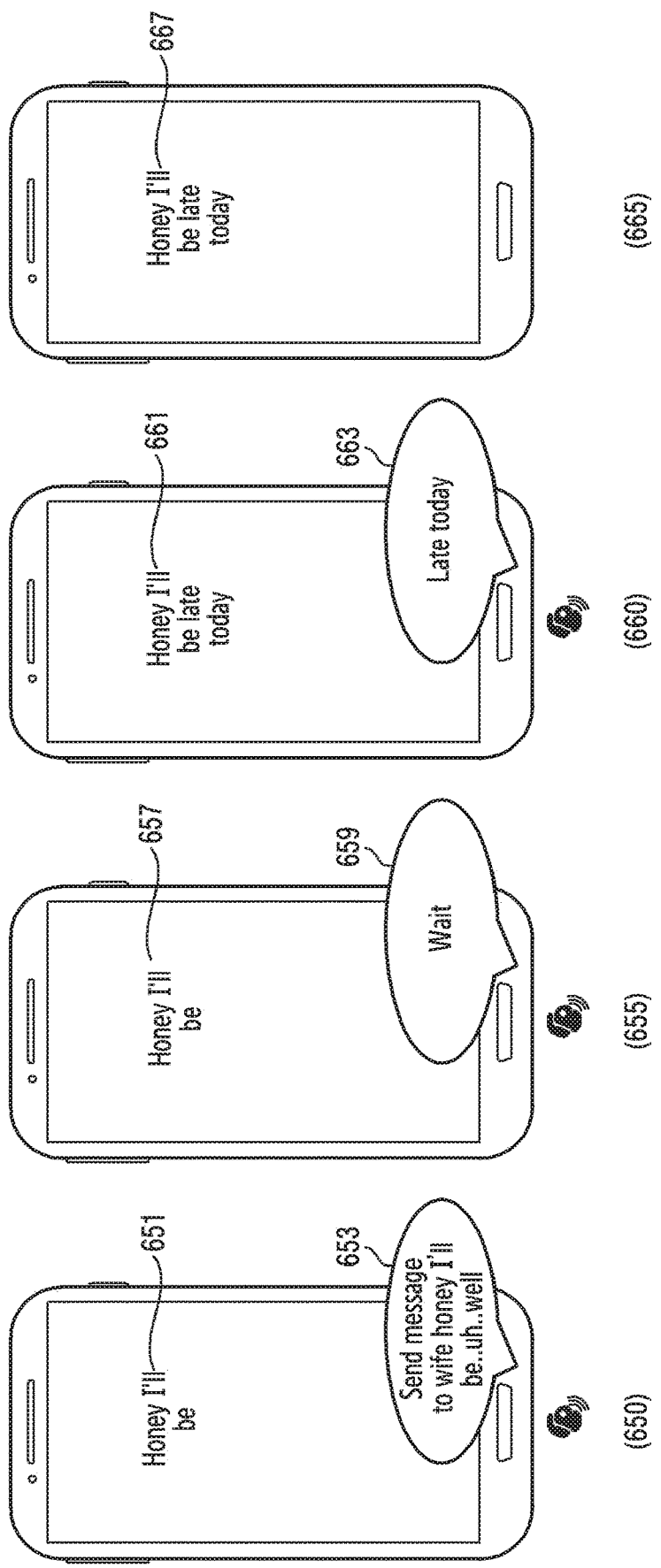

FIGS. 6A to 6C are views illustrating examples of user interfaces according to various embodiments.

FIG. 6A illustrates an example of extending an EPD time according to detection of an empty word.

Referring to FIG. 6A, the electronic device 400 (for example, the processor 410) may receive a voice command regarding sending of a message from a user. For example, the processor 410 may receive a first voice input 613 such as "Send message to wife honey I'll be . . . uh . . . well" The processor 410 may display a first user interface 610 including text information 611 corresponding to the first voice input 613 on the display 460. The processor 410 according to various embodiments may provide a part or entirety of the first voice input 613 as the text information 611.

For example, the processor 410 may recognize "Send message" of the first voice input 613 as a message application executing instruction, may recognize "to wife" of the first voice input 613 as a message recipient, and may recognize "honey I'll be" of the first voice input 613 as a message content. The processor 410 may process the text information corresponding to the first voice input 613 when analyzing the first voice input 613 and performing a function corresponding to the voice input. For example, the processor 410 may recognize "honey I'll be . . . uh . . . well" of the first voice input 613 as a message content, and may interpret "uh . . . well" as a meaningless word (for example, an empty word) and may delete the meaningless word when sending the message. The processor 410 may provide an execution screen of a message application showing that the recipient is wife and text information is included in the message content as the first user interface 610 to third user interface 620.

According to various embodiments, the processor 410 may already execute the message application before the voice command is received. Alternatively, the processor 410 may receive the voice command by a voice invoking instruction when the display 460 is turned off.

When the first voice input 613 is detected or the first voice input 613 is ended, the processor 410 may count an EPD time and may determine whether a new voice input is detected before the EPD time expires. When the new voice input is not detected before the EDP time expires and the EDP time expires as it is, the processor 410 may determine whether the last word is a predetermined word. For example, when the last word (for example, uh, well) corresponds to the predetermined word (for example, an empty word) based on information stored in the memory 470, the processor 410 may extend the EPD time and may wait for an input of a voice from the user. The processor 410 may receive a second voice input 619 from the user for a voice input waiting time (for example, the EPD time). For example, the processor 410 may receive the second voice input 619 while displaying a second user interface 615 including the same or similar text information 617 as or to that of the first user interface 610 on the display 460. Alternatively, the processor 410 may display text information 621 corresponding to the first voice input 613 and the second voice input 619 on the second user interface 615 at the same time as receiving the second voice input 619.

The processor 410 may display the third user interface 620 including the text information 621 corresponding to the first voice input 613 and the second voice input 619 on the display 460. When a new voice input is not detected after the second voice input 619, the EPD time expires, and the last word (for example, today) does not correspond to the predetermined word, the processor 410 may process voice recognition corresponding to the text information 621. For example, the processor 410 may transmit the text information 621 to the voice processing server, and may receive an instruction to send the message including the text information 621 to the recipient (for example, wife) from the voice processing server, and may send the message according to the instruction. When sending of the message is completed according to the voice recognition processing, the processor 410 may display a fourth user interface 625 including a sending completion message 627 on the display 460. When the voice recognition processing is completed, the processor 410 may output voice information corresponding to the sending completion message 627 through the speaker 450.

FIG. 6B is a view illustrating an example of extending an EDP time according to detection of a conjunction.

Referring to FIG. 6B, the electronic device 400 (for example, the processor 410) may receive a voice command regarding control of an external electronic device from a user. For example, the processor 410 may receive a first voice input 633 such as "Turn on living room light . . . and" The processor 410 may display a first user interface 630 including text information 631 corresponding to the first voice input 633 on the display 460. The processor 410 according to various embodiments may provide a part or entirety of the first voice input 633 as the text information 631. For example, the processor 410 may recognize "Turn on" of the first voice input 633 as a device control instruction, and may recognize "living room light" of the first voice input 633 as a device identifier. Alternatively, when the first voice input 633 is a device control command, the processor 410 may interpret "and" as a meaningless word (for example, a conjunction), and may remove "and" when recognizing the voice.

The processor 410 according to various embodiments may be paired with an external electronic device before the voice command is received. Alternatively, the processor 410 may try to be paired with the external electronic device according to a voice invoking instruction when the display 460 is turned off. The processor 410 may provide, as the first user interface 630 to third user interface 640, an execution screen of a device control application that displays an arrangement structure of the external electronic device or a position of the external electronic device corresponding to the voice command to be distinguished from other external electronic devices.

When the first voice input 633 is detected or is ended, the processor 410 may count the EPD time and may determine whether a new voice input is detected before the EDP time expires. When the new voice input is not detected before the EPD time expires and the EPD time expires as it is, the processor 410 may determine whether the last word is a predetermined word. For example, when the last word (for example, and) corresponds to the predetermined word (for example, a conjunction) based on information stored in the memory 470, the processor 410 may extend the EPD time and may wait for an input of a voice from the user. The processor 410 may receive a second voice input 639 from the user for a voice input waiting time (for example, the EPD time). For example, the processor 410 may receive the second voice input 639 while displaying the second user interface 635 including the same or similar text information 637 as or to that of the first user interface 630 on the display 460. Alternatively, the processor 410 may display text information 641 corresponding to the first voice input 633 and the second voice input 639 on the second user interface 635 at the same time as receiving the second voice input 639.

The processor 410 may display the third user interface 640 including the text information 641 corresponding to the first voice input 633 and the second voice input 639 on the display 460. When a new voice input is not detected after the second voice input 639, the EPD time expires, and the last word (for example, speaker) does not correspond to the predetermined word, the processor 410 may process voice recognition corresponding to the text information 641. For example, the processor 410 may transmit the text information 641 to the voice processing server and receive an instruction "Turn on the living room light and play the music through the kitchen speaker." from the voice processing server, and may control to turn on the light of the living room and to play the music through the speaker of the kitchen. When the voice command is completed according to the voice recognition processing, the processor 410 may display a fourth user interface 645 including a command completion message 647 on the display 460. When the voice recognition processing is completed, the processor 410 may output voice information corresponding to the command 647 completion message 647 through the speaker 450.

FIG. 6C is a view illustrating an example of extending an EPD time according to detection of an empty word and a waiting instruction.

Referring to FIG. 6C, the electronic device 400 (for example, the processor 410) may receive a voice command regarding sending of a message from a user. For example, the processor 410 may receive a first voice input 653 such as "Send message to wife honey I'll be . . . uh . . . well . . . " The processor 410 may display a first user interface 650 including text information 651 corresponding to the first voice input 653 on the display 460. The processor 410 according to various embodiments may provide a part or entirety of the first voice input 653 as the text information 651.

When the first voice input 653 is detected or the first voice input 653 is ended, the processor 410 may count an EPD time and may determine whether a new voice input is detected before the EPD time expires. When the new voice input is not detected before the EDP time expires and the EDP time expires, the processor 410 may determine whether the last word is a predetermined word. For example, when the last word (for example, uh, well) corresponds to the predetermined word (for example, an empty word) based on information stored in the memory 470, the processor 410 may extend the EPD time and may wait for an input of a voice from the user. The processor 410 may receive a second voice input 659 from the user for a voice input waiting time (for example, the EPD time). For example, the processor 410 may display a second user interface 655 including the same or similar text information 657 as or to that of the first user interface 650 on the display 460. Alternatively, the processor 410 may display text information (for example, Honey I'll be wait) corresponding to the first voice input 653 and the second voice input 659 on the second user interface 655 at the same time as receiving the second voice input 659.

When a new voice input is not detected after the second voice input 659 and the EPD time expires, the processor 410 may determine whether the last word (for example, wait) corresponds to the predetermined word (for example, a waiting instruction). Alternatively, the processor 410 may determine whether the second voice input 659 received before the EPD time expires corresponds to the predetermined word. For example, when the last word (for example, wait) corresponds to the predetermined word (for example, a waiting instruction) based on information stored in the memory 470, the processor 410 may extend the EPD time and may wait for an input of a voice from the user. The processor 410 may receive a third voice input 663 from the user during a voice input waiting time (for example, the EPD time). For example, the processor 410 may display text information 661 corresponding to the first voice input 651 and the third voice input 663 on a third user interface 660 at the same time as receiving the third voice input 663.

The processor 410 may display a fourth user interface 665 including text information 667 corresponding to the first voice input 651 and the third voice input 663 on the display 460. When a new voice input is not detected after the third voice input 663, the EPD time expires, and the last word (for example, today) does not correspond to the predetermined word, the processor 410 may process voice recognition corresponding to the text information 667. When sending of the message is completed according to the voice recognition processing although it is not illustrated, the processor 410 may display a fifth user interface (for example, the fourth user interface 665) including a sending completion message on the display 460. When the voice recognition processing is completed, the processor 410 may output voice information corresponding to the sending completion message 667 through the speaker 450.

Figure 7:
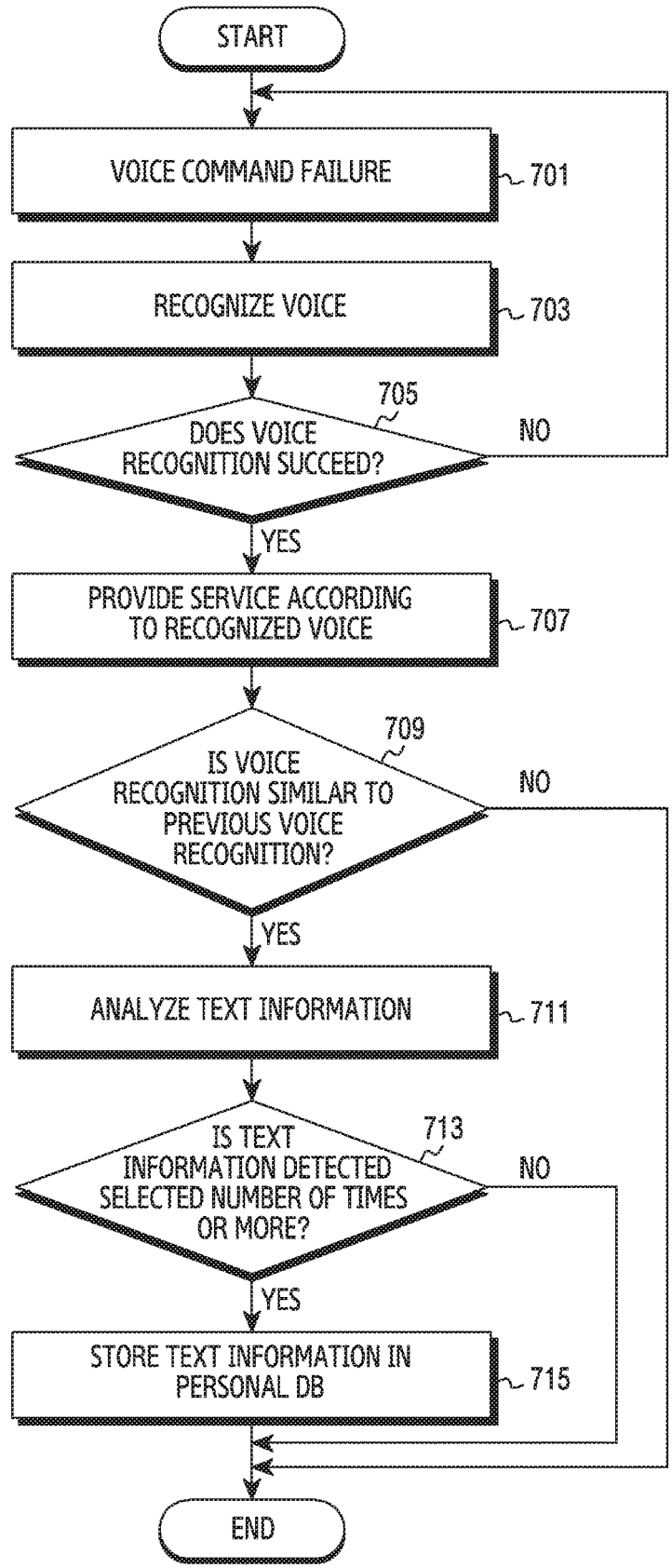
FIG. 7 is a flowchart illustrating a method for collecting personal words in the electronic device according to various embodiments.

FIG. 7 is a flowchart illustrating a method for collecting a personal word in the electronic device according to various embodiments.

Referring to FIG. 7, in operation 701, the electronic device 400 (for example, the processor 410) may recognize a voice command failure. The voice command failure may include a case in which a voice command is stopped (or canceled) by a user or a case in which the processor 410 does not process voice recognition. When a voice command fails, the user may input a voice command again (for example, the user may speak or input a voice).

In operation 703, the electronic device 400 (for example, the processor 410) may process voice recognition. For example, the processor 410 (for example, the voice recognition unit 411) may receive a voice input from the user according to the voice command failure and may process the voice input.

In operation 705, the electronic device 400 (for example, the processor 410) may determine whether the voice recognition succeeds. For example, the processor 400 (for example, the voice recognition unit 411) may determine whether a function corresponding to the voice input detected in operation 703 is rightly performed.

When the voice recognition succeeds, the processor 410 may perform operation 707, and, when the voice recognition does not succeed, the processor 410 may return to operation 701.

In operation 707, the electronic device 400 (for example, the processor 410) may provide a service (or function) according to the recognized voice. Operation 707 may be included in operation 703 and performed. In this case, operation 707 may be omitted. That is, when the function according to the voice recognition is provided in operation 703, operation 707 may be omitted.

In operation 709, the electronic device 400 (for example, the processor 410) may determine whether the voice recognition is similar to previous voice recognition. For example, the user may input a similar or same voice command to or as a previous voice command due to the voice recognition failure in operation 701. The processor 410 may collect a personal word with respect to the voice command inputted within a predetermined time after the voice command failure by comparing the previous voice command (for example, previous voice recognition) and the current voice command (for example, current voice recognition). For example, the processor 410 may determine similarity between the voice recognition (for example, previous voice recognition) failing in operation 701, and the voice recognition recognized in operation 707. When the similarity between the previous voice recognition and the current voice recognition is greater than or equal to a predetermined ratio (for example, 70%), the processor 410 may determine that the previous voice recognition and the current voice recognition are similar to each other.

When the current voice recognition is similar to the previous voice recognition, the processor 41 may perform operation 711, and when the current voice recognition is not similar to the previous voice recognition, the processor 410 may finish the process.

In operation 711, the electronic device 400 (for example, the processor 410) may analyze text information. For example, the processor 410 may analyze a text of a different portion between the previous voice recognition and the current voice recognition. The text analysis may be performed based on text information obtained by performing speech to text.

In operation 713, the electronic device 400 (for example, the processor 410) may determine whether analyzed text information is detected a selected number of times or more. The processor 410 may temporarily store the analyzed text information in the memory 470 or may store the number of times that the text information is detected in the memory 470. The processor 410 may determine whether the number of times that the analyzed text information is detected is greater than or equal to the selected number of times (for example, 5 times or 10 times).

When the analyzed text information is detected the selected number of times or more, the processor 410 may perform operation 715, and, when the analyzed text information is not detected the selected number of times or more, the processor 410 may finish the process. For example, when the analyzed text information is not detected the selected number of times or more, the processor 410 may increase the number of times that the analyzed text information is detected in the memory 470 by 1, and may finish the process.

In operation 715, the electronic device 400 (for example, the processor 410 may store the text information in a personal database (DB). For example, when the analyzed text information is detected the selected number of times or more, the processor 410 may store the detected text information in the memory 470 as a personal word. In this case, the processor 410 may refer to the personal words stored in the memory 470 when determining whether a last word corresponds to a predetermined word, such that a user's intent to end speech can be more exactly analyzed. The personal words collected in this way may be collected and managed according to each user as shown in table 2.

Figure 8A:
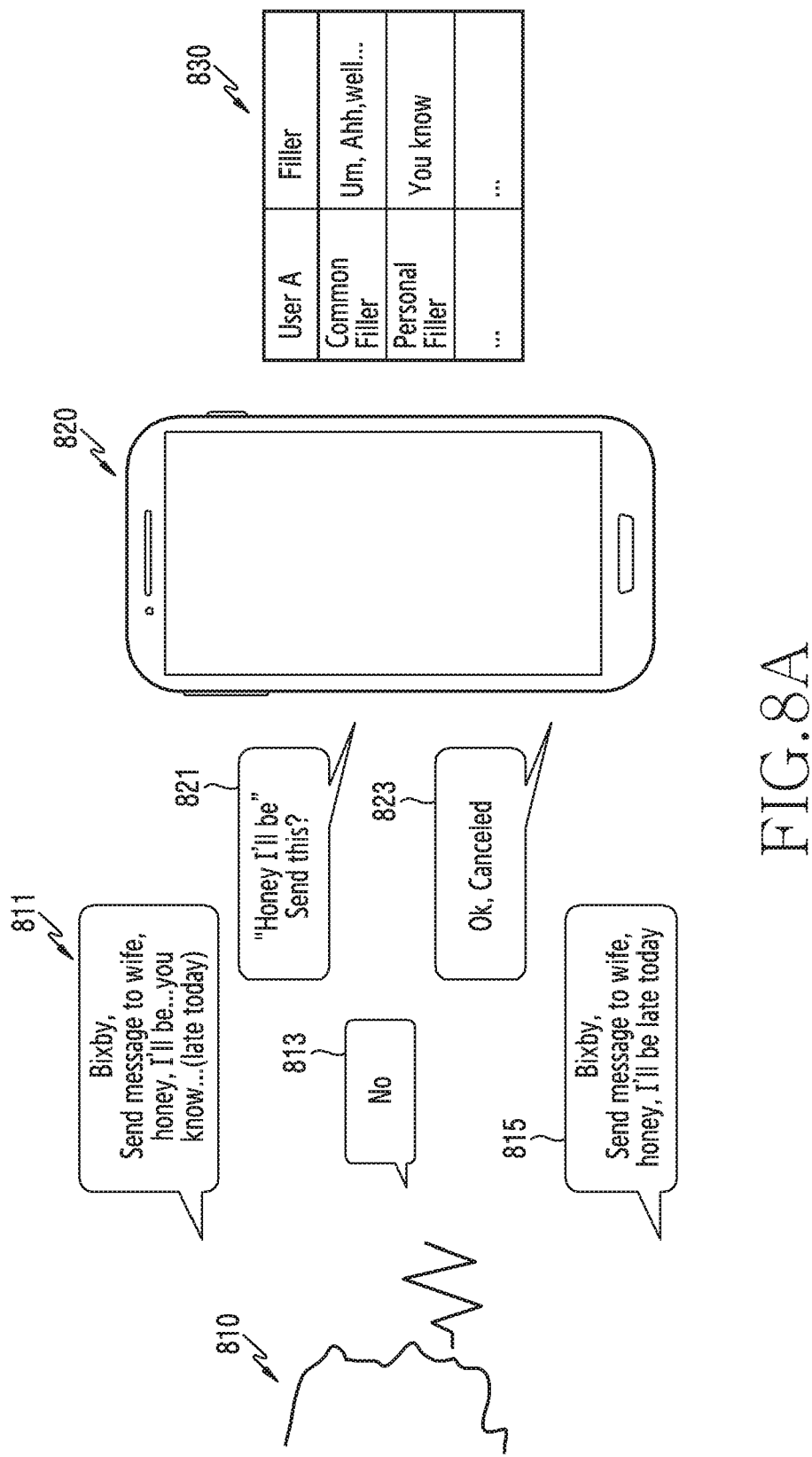
FIGS. 8A to 8C are views illustrating examples of collecting personal language information in an electronic device according to various embodiments.
Figure 8B:
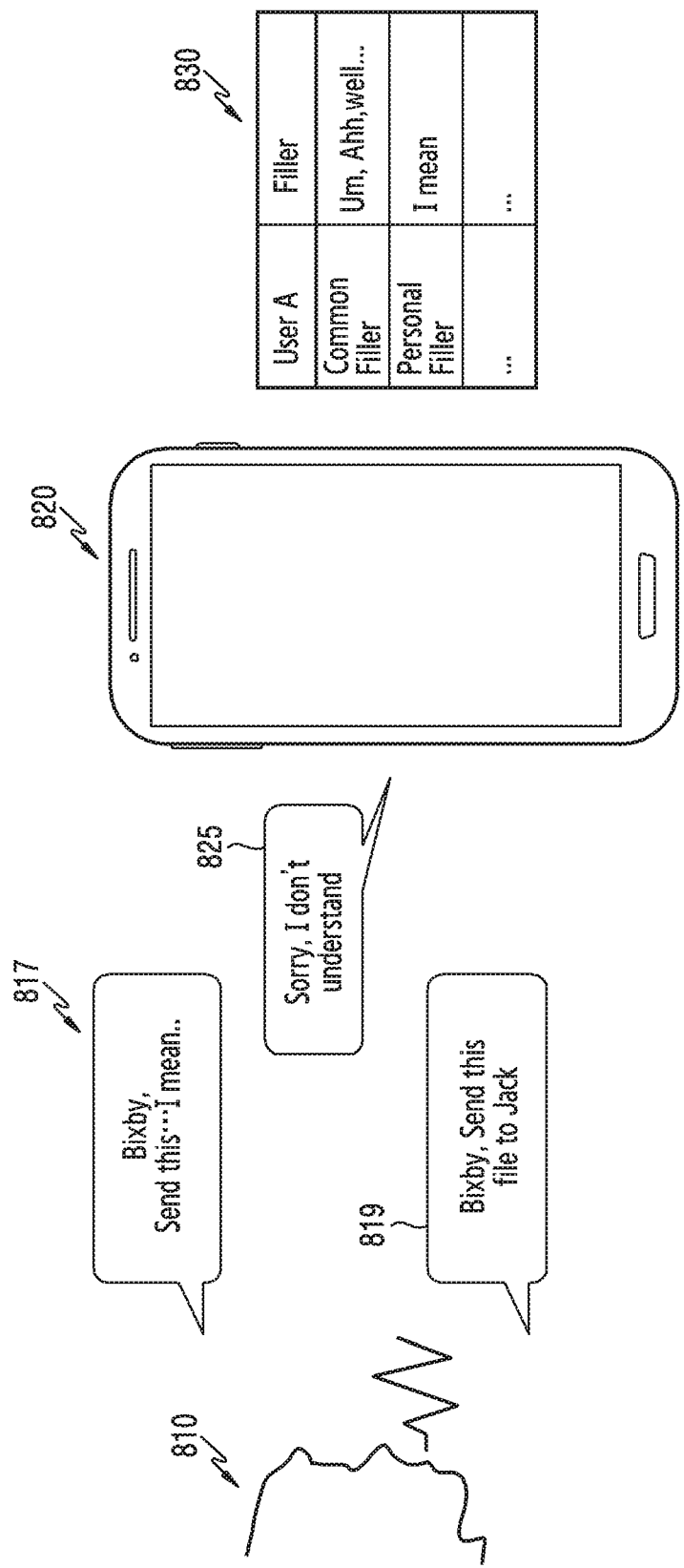
Figure 8C:
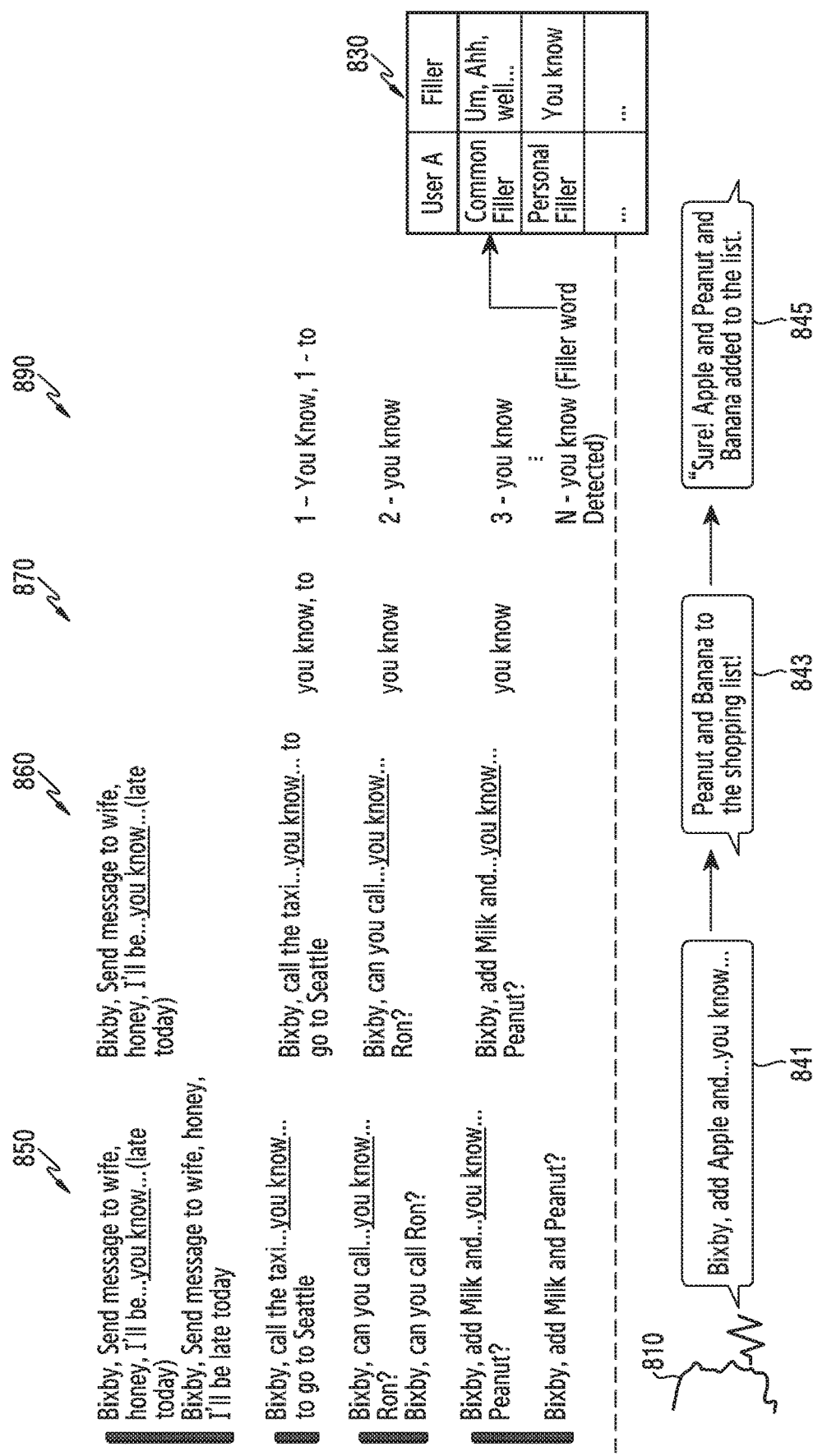

FIGS. 8A to 8C are views illustrating examples of collecting a personal word in an electronic device according to various embodiments.

FIG. 8A is a view illustrating an example of collecting a personal word when a voice command is canceled by a user request.

Referring to FIG. 8A, an electronic device 820 may receive a first voice input 811 from a user 810, and may identify a first voice command 821. However, although the user 810 does not complete the voice input, the electronic device 820 may determine that the voice input is completed and may recognize the first voice command 821 based on the inputted voice. In this case, the user 810 may speak a voice cancel input 813. The electronic device 820 may receive the voice cancel input 813 and may process a cancel command 823. The user may speak again a second voice input 815 similar to the first voice input 811 after the voice cancel input 813.

When the second voice input 815 which is the same as or similar to the first voice input 811 is received after the cancel command 823 is performed, the electronic device 820 may process voice recognition with respect to the second voice input 815. For example, the electronic device 820 may send a message according to the second voice input 815. After sending the message, the electronic device 820 may determine similarity between the first voice input 811 and the second voice input 815, and, when the similarity is high, the electronic device 820 may analyze changed text information (for example, "you know") between the first voice input 811 and the second voice input 815, and may store the text information in a personal DB 830. Thereafter, the electronic device 820 may extend an EPD time when a last word corresponds to a personal word, based on the personal words stored in the personal DB 830.

The electronic device 820 according to various embodiments may set the EPD time to be different according to characteristics of the user (for example, a speech rate, a speech habit). For example, when a specific word (for example, an empty word, a conjunction, a waiting instruction) is detected as a result of analyzing user's speech history (for example, habit, speed) over a predetermined period, the electronic device 820 may recognize the average total EPD time extended as N+M seconds. In this case, when an input of a specific word is detected based on characteristics of the user, the electronic device 820 may extend the EPD time to N+M seconds.

FIG. 8B is a view illustrating an example of collecting a personal word when a voice command fails.

Referring to FIG. 8B, the electronic device 820 may receive a first voice input 817 from the user 810 and may output a feedback 825 regarding a voice recognition failure. For example, when the electronic device 820 does not find a function to be performed in response to the received first voice input 817 or fails to convert the inputted voice information into text information, the electronic device 820 may output the recognition failure feedback 825. For example, the electronic device 820 may not find the function corresponding to the first voice input 817 due to an empty word (for example, I mean) included in the first voice input 817. In this case, the user 810 may speak again a second voice input 819 similar to the first voice input 817 more exactly. For example, the user 810 may speak a voice input excluding the empty word from the first voice input 817 as the second voice input 819 to input a more exact voice command.

When the second voice input 819 is received after the recognition failure feedback 825 is outputted, the electronic device 820 may process voice recognition with respect to the second voice input 819. For example, the electronic device 820 may send a message (or email) according to the second voice input 819 (for example, send a file to the recipient, Jack). After the sending of the message (or email) is completed, the electronic device 820 may determine similarity between the first voice input 817 and the second voice input 819, and, when the similarity is high, the electronic device 820 may analyze changed text information (for example, I mean) between the first voice input 817 and the second voice input 819, and may store the text information in the personal DB 830. The electronic device 820 may extend the EPD time when a last word corresponds to a personal word based on the personal words stored in the personal DB 830.

FIG. 8C is a view illustrating an example of analyzing a personal word in the electronic device according to various embodiments.

Referring to FIG. 8C, the electronic device 820 may store a personal word in the personal DB 830 by performing a two-voice command comparison operation 850, a failed voice command collection operation 860, a word extraction operation 870, and a number-of-times-of-word-detection counting operation 890. For example, the comparison operation 850 may be an operation of comparing a first voice command (for example, a previous voice command) and a second voice command (for example, a re-recognized voice command). The electronic device 820 may analyze text information between the two voice commands in the comparison operation 850. The collection operation 860 may be an operation of analyzing text information regarding the failed voice command. The electronic device 820 may perform an operation of extracting a repeated meaningless word among the words included in the voice command (operation 870) through the comparison operation 850 and the collection operation 860. The counting operation 890 may be an operation of determining whether the number of times the repeated word is detected is greater than or equal to a predetermined number of times.

When a first voice input 841 is received from the user 810 after the personal DB 830 is prepared, the electronic device 820 may determine whether the first voice input 841 includes the personal word stored in the personal DB 830. When the first voice input 841 includes the personal word, the electronic device 820 may extend the EPD time and may wait for reception of a voice input. The electronic device 820 may receive a second voice input 843 while waiting for reception of a voice input. The electronic device 820 may process a voice recognition function 845 based on text information including the first voice input 841 and the second voice input 843.

The electronic device 820 according to various embodiments prepares the personal DB 830 based on personal characteristics such as user's intonation, habit, way of speaking, etc., such that a user's intent to end speech can be more exactly determined.

Figure 9:
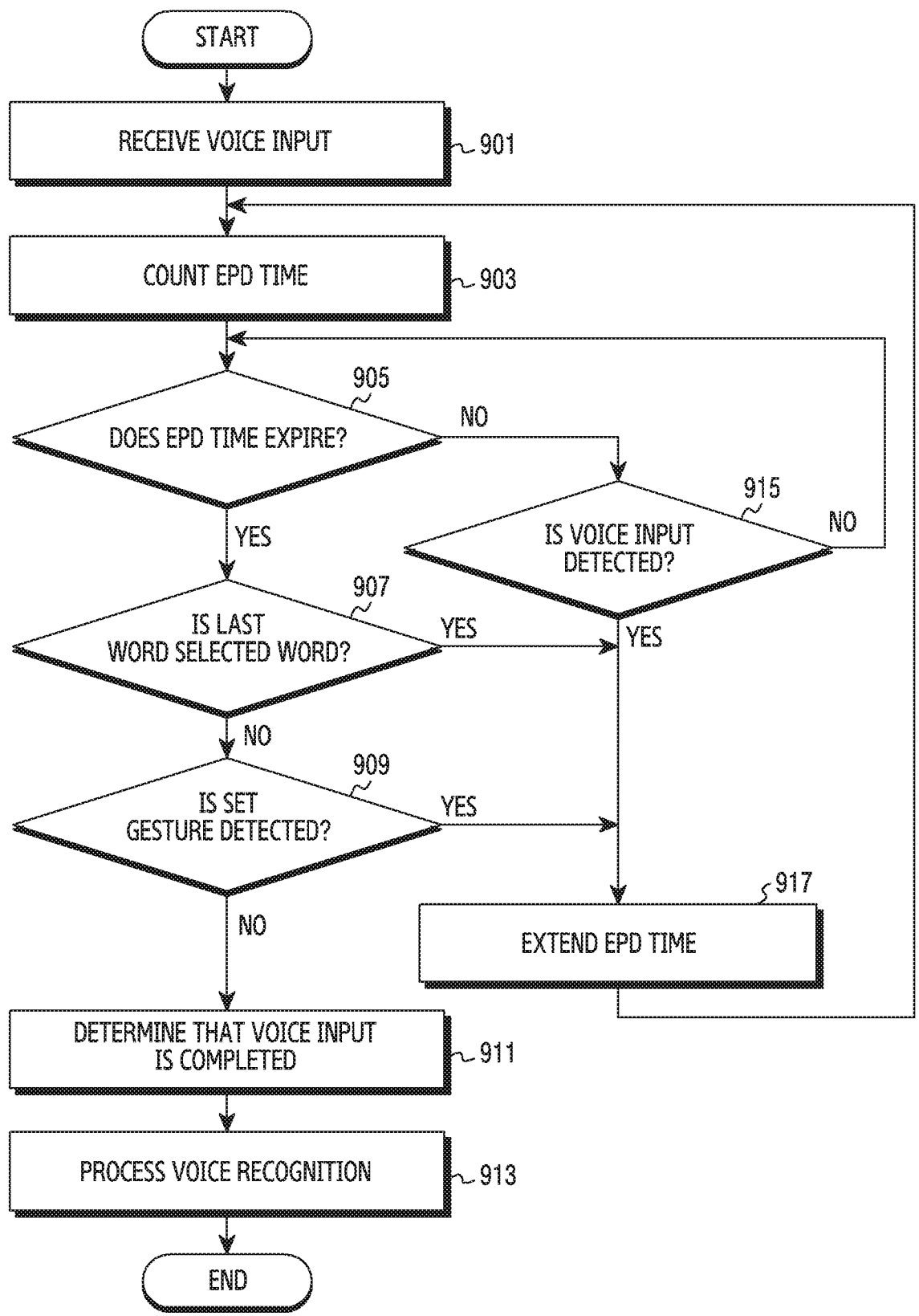
FIG. 9 is a flowchart illustrating a method for sensing an end of speech in the electronic device according to various embodiments.

FIG. 9 is a flowchart illustrating a method for sensing an end of speech in the electronic device according to various embodiments.

Referring to FIG. 9, in operation 901, the electronic device 400 (for example, the processor 410) may receive a voice input. The processor 410 (for example, the voice input unit 411) may detect whether a sound is inputted from the microphone 420. Operation 901 is similar to or the same as operation 501 of FIG. 5A, and thus a detailed description thereof is omitted.

In operation 903, the electronic device 400 (for example, the processor 410) may count an EPD time. For example, the EPD time may be a waiting time for determining that the voice input is ended, and may indicate an input waiting time or a microphone recording waiting time. Operation 903 is similar to or the same as operation 503 of FIG. 5A, and thus a detailed description thereof is omitted.

In operation 905, the electronic device 400 (for example, the processor 410) may determine whether the EPD time expires. The processor 410 (for example, the EPD time control unit 413) may count the EPD time and then may continuously determine whether the EPD time expires.

When the EPD time does not expire, the processor 410 may perform operation 915, and, when the EPD time expires, the processor 410 may perform operation 907.

When the EPD time does not expire, the electronic device 400 (for example, the processor 410) may determine whether a voice input is detected in operation 915. The processor 410 (for example, the voice recognition unit 411) may determine whether a new voice input is detected before the EPD time expires.

When a voice input is detected, the processor 410 may perform operation 917, and, when a voice input is not detected, the processor 410 may return to operation 905.

When a voice input is detected, the electronic device 400 (for example, the processor 410) may extend the EPD time in operation 917. The processor 410 (for example, the EPD time control unit 413) may re-count the EPD time when a voice input is detected for the EPD time. The processor 410 may count the EPD time from a time at which the detected voice input is ended.

When the EPD time expires, the electronic device 400 (for example, the processor 410) may determine whether a last word is a selected word in operation 907. The last word may be an entirety or a part of text information corresponding to voice information inputted last by the user. For example, when a voice input is not detected after the last word and the EPD time expires, the processor 410 (for example, the language determination unit 415) may determine whether the last word is a predetermined word.

When the last word is the selected word, the processor 410 may perform operation 917, and, when the last word is not the selected word, the processor 410 may perform operation 909.

In operation 909, the electronic device 400 (for example, the processor 410) may determine whether a predetermined gesture is detected. The processor 410 (for example, the gesture determination unit 417) may determine whether a user's gesture detected from the camera 430 or a sensor (for example, a motion sensor) is the predetermined gesture. The user may make a specific gesture while thinking of a word that the user wishes to speak since the user does not remember the exact word while inputting a voice. For example, the user may raise user's eyebrows or move user's hands while speaking. In addition, the user may look up and to the right or may tilt user's head while thinking. Alternatively, when the user ends (or stops) speaking, the user may not move user's hand. The processor 410 may determine whether the predetermined gesture including a common gesture or a personal gesture is detected. For example, the processor 410 may determine whether a gesture detected after the EPD time expires or before the EPD time expires is the predetermined gesture.

Although FIG. 9 depicts that operation 907 is performed first and then operation 909 is performed, operation 909 may be performed first and then operation 907 may be performed, or operation 907 and operation 909 may be performed simultaneously. This is a simple design change and the order of operations is not limited by the drawings.

When the predetermined gesture is detected, the processor 410 may perform operation 917, and, when the predetermined gesture is not detected, the processor 410 may perform operation 911.

In operation 911, the electronic device 400 (for example, the processor 410) may determine that the voice input is completed. For example, when the EPD time expires, the last word is not the selected word, and the detected gesture is not the predetermined gesture, the processor 410 (for example, the voice recognition unit 411) may determine that the user has an intent to end the voice input. Operation 911 is similar to or the same as operation 509 of FIG. 5A, and thus a detailed description thereof is omitted.

In operation 913 the electronic device 400 (for example, the processor 410) may process voice recognition. The processor 410 (for example, the voice recognition unit 411) may provide a service according to the user's voice input. Operation 913 is similar to or the same as operation 511 of FIG. 5A and thus a detailed description thereof is omitted.

The processor 410 according to various embodiments may determine an EPD extension time when a voice input is detected, an EPD extension time when a predetermined word is detected, or an EPD extension time when a predetermined gesture is detected to be equal or different. The processor 410 may set the EPD extension time to be equal or different based on setting of the user or setting of the electronic device 400.

Figure 10:
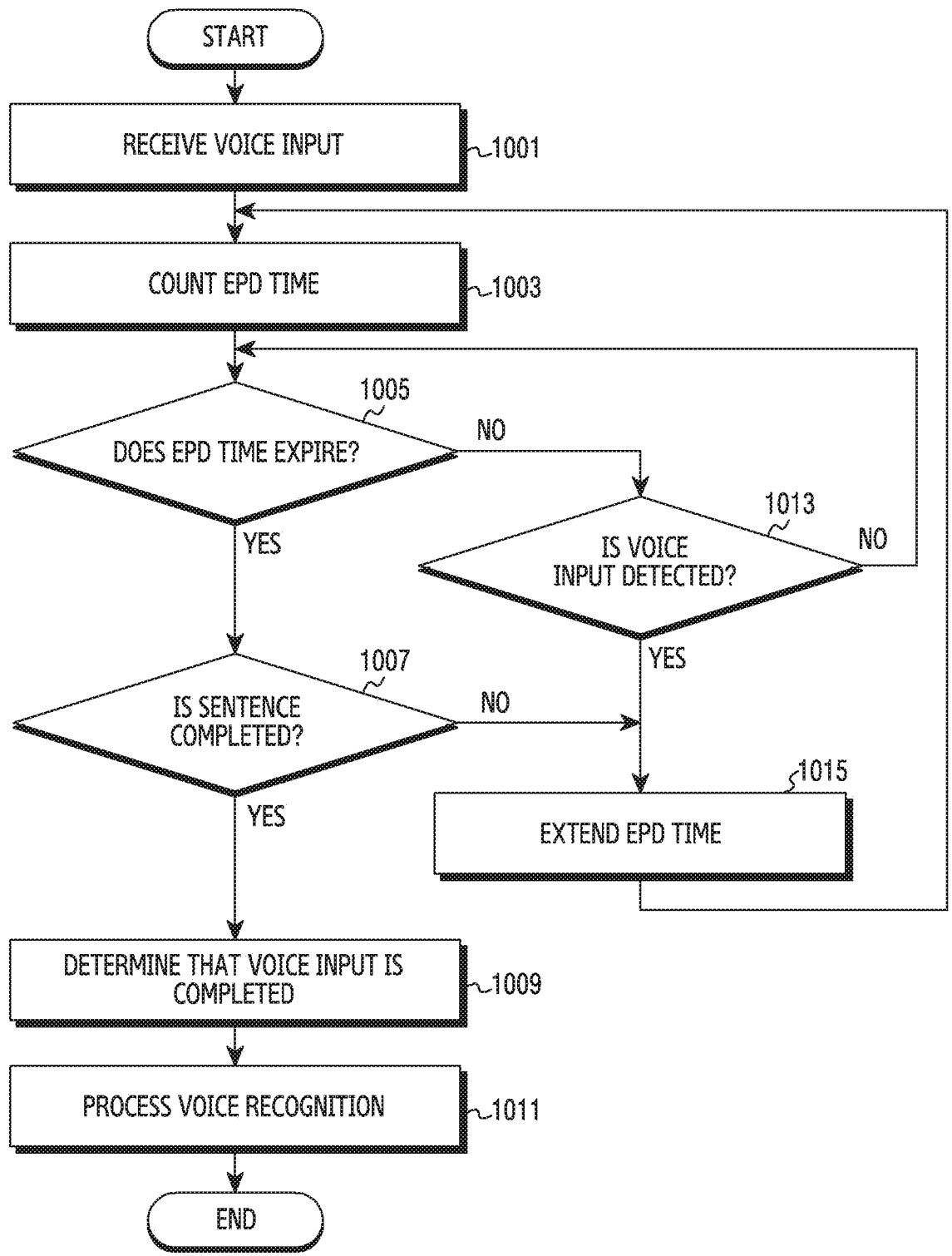
FIG. 10 is another flowchart illustrating a method for sensing an end of speech in the electronic device according to various embodiments.

FIG. 10 is another flowchart illustrating a method for sensing an end of speech in the electronic device according to various embodiments.

Referring to FIG. 10, in operation 1001, the electronic device 400 (for example, the processor 410) may receive a voice input. The processor 410 (or the voice recognition unit 411) may detect whether a sound is inputted from the microphone 420. Operation 1001 is similar to or the same as operation 501 of FIG. 5A, and thus a detailed description thereof is omitted.

In operation 1003, the electronic device 400 (for example, the processor 410) may count an EPD time. For example, the EPD time is a waiting time for determining that a voice input is ended, and may indicate an input waiting time or a microphone recording waiting time. Operation 1003 is similar to or the same as operation 503 of FIG. 5A, and thus a detailed description thereof is omitted.

In operation 1005, the electronic device 400 (for example, the processor 410) may determine whether the EPD time expires. The processor 410 (for example, the EPD time control unit 413) may count the EPD time and then may continuously determine whether the EPD time expires.

When the EPD time does not expire, the processor 410 may perform operation 1013, and, when the EPD time expires, the processor 410 may perform operation 1007.

When the EPD time does not expire, the electronic device 400 (for example, the processor 410) may determine whether a voice input is detected in operation 1013. The processor 410 (for example, the voice recognition unit 411) may determine whether a new voice input is detected before the EPD time expires.

When a voice input is detected, the processor 410 may perform operation 1015, and, when the voice input is not detected, the processor 410 may return to operation 1005.

When a voice input is detected, the electronic device 400 (for example, the processor 410) may extend the EPD time in operation 1005. When the voice input is detected for the EPD time, the processor 410 (for example, the EPD time control unit 413) may re-count the EPD time.

When the EPD time expires, the electronic device 400 (for example, the processor 410) may determine whether a sentence according to the voice input is completed in operation 1007. In the case of a grammatically completed sentence, there is a high possibility that the user completes the speech, but in the case of an incomplete sentence, there is a high possibility that the user continues speaking. The processor 410 may determine whether to extend the EPD time based on whether the sentence is completed or not. To achieve this, the processor 410 may analyze text information corresponding to the voice information inputted in operation 1001 or 1013, and may determine whether the sentence is completed based on the analyzed text information. According to various embodiments, the processor 410 may determine whether the sentence is not completed and an essential word for completing the sentence is required. When the essential word is not required, the processor 410 may determine that the voice input is completed although the sentence is not completed. Alternatively, when the essential word is required, the processor 410 may extend the EPD time to receive an additional voice input.

The processor 410 according to various embodiments may collect context information of the electronic device 400 and may determine whether to perform operation 1007 of determining whether the sentence is completed, based on the context information. For example, a sentence may not be completed, but there may be no problem in performing a function corresponding to a voice command. Accordingly, the processor 410 may determine that the voice input is completed even when the sentence is not completed based on a type of a voice command.

When the sentence is completed, the processor 410 may perform operation 1009, and, when the sentence is not completed, the processor 410 may return to operation 1015.

In operation 1009, the electronic device 400 (for example, the processor 410) may determine that the voice input is completed. For example, when the EPD time expires, the last word is not the selected word, and the detected gesture is not the predetermined gesture, the processor 410 (for example, the voice recognition unit 411) may determine that the user has an intent to end the voice input. Operation 1009 is similar to or the same as operation 509 of FIG. 5A, and thus a detailed description thereof is omitted.

In operation 1011, the electronic device 400 (for example, the processor 410) may process voice recognition. The processor 410 (for example, the voice recognition unit 411) may provide a service according to the user's voice input. Operation 1011 is similar to or the same as operation 511 of FIG. 5A, and a detailed description thereof is omitted.

The processor 410 according to various embodiments may determine an EPD extension time when a voice input is detected or an EPD extension time when a sentence is not completed to be equal or different. The processor 410 may set the EPD extension time to be equal or different based on setting of the user or setting of the electronic device 400.

Figure 11:
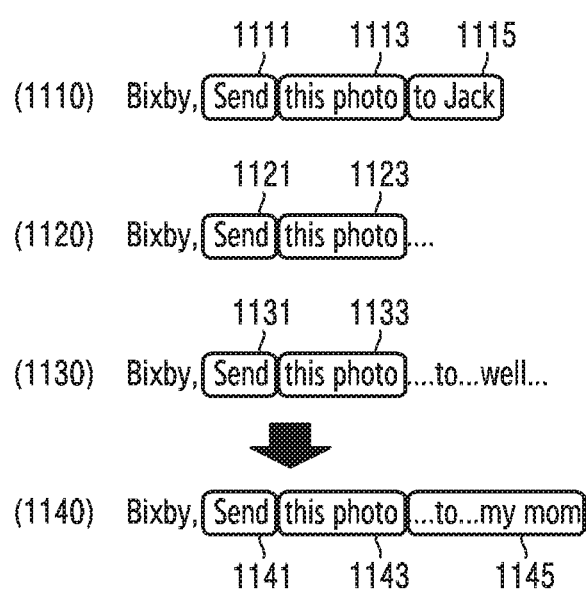
FIG. 11 is a view illustrating an example of determining whether a sentence is completed in the electronic device according to various embodiments.

FIG. 11 is a view illustrating an example of determining whether a sentence is completed in the electronic device according to various embodiments.

Referring to FIG. 11, the electronic device 400 (for example, the processor 410) may determine whether a sentence is completed, based on a type of a voice command (for example, a command to send a photo). The processor 410 may interpret a voice command 1110 related to sending of a photo as a complete sentence when all of a verb 111 (send), an object 113 (this photo), and a recipient 1115 (Jack) are inputted. The processor 410 may process voice information inputted from the user, and may recognize the voice command 1110. For example, the processor 410 may delete a meaningless word (for example, a preposition) among the words included in the voice information (for example, send this photo to Jack).

When a first voice command 1120 including only a verb 1121 and an object 1123 is received, the processor 410 may determine that the sentence is an incomplete sentence. In this case, when the first voice command 1120 is received, the processor 410 may extend an EPD time. Alternatively, when a second voice command 1130 including only a verb 1131 and an object 1133, the processor 410 may determine that the sentence is an incomplete sentence. In this case, when additional words (to, well) are further detected in addition to the verb 1131 and the object 1133, but a recipient related to the additional words is not found, the processor 410 may determine that the sentence is an incomplete sentence. When the second voice command 1130 is received, the processor 410 may extend the EPD time. When the first voice command 1120 or the second voice command 1130 is received, the processor 410 may extend the EPD time and thus may receive a third voice command 1140. The third voice command 1140 may be configured as a completed sentence including all of a verb 1141, an object 1143, and a recipient 1145. The processor 410 further receives the voice input corresponding to the recipient 1145 for the EPD extension time, such that the completed third voice command 1140 can be obtained.

Figure 12:
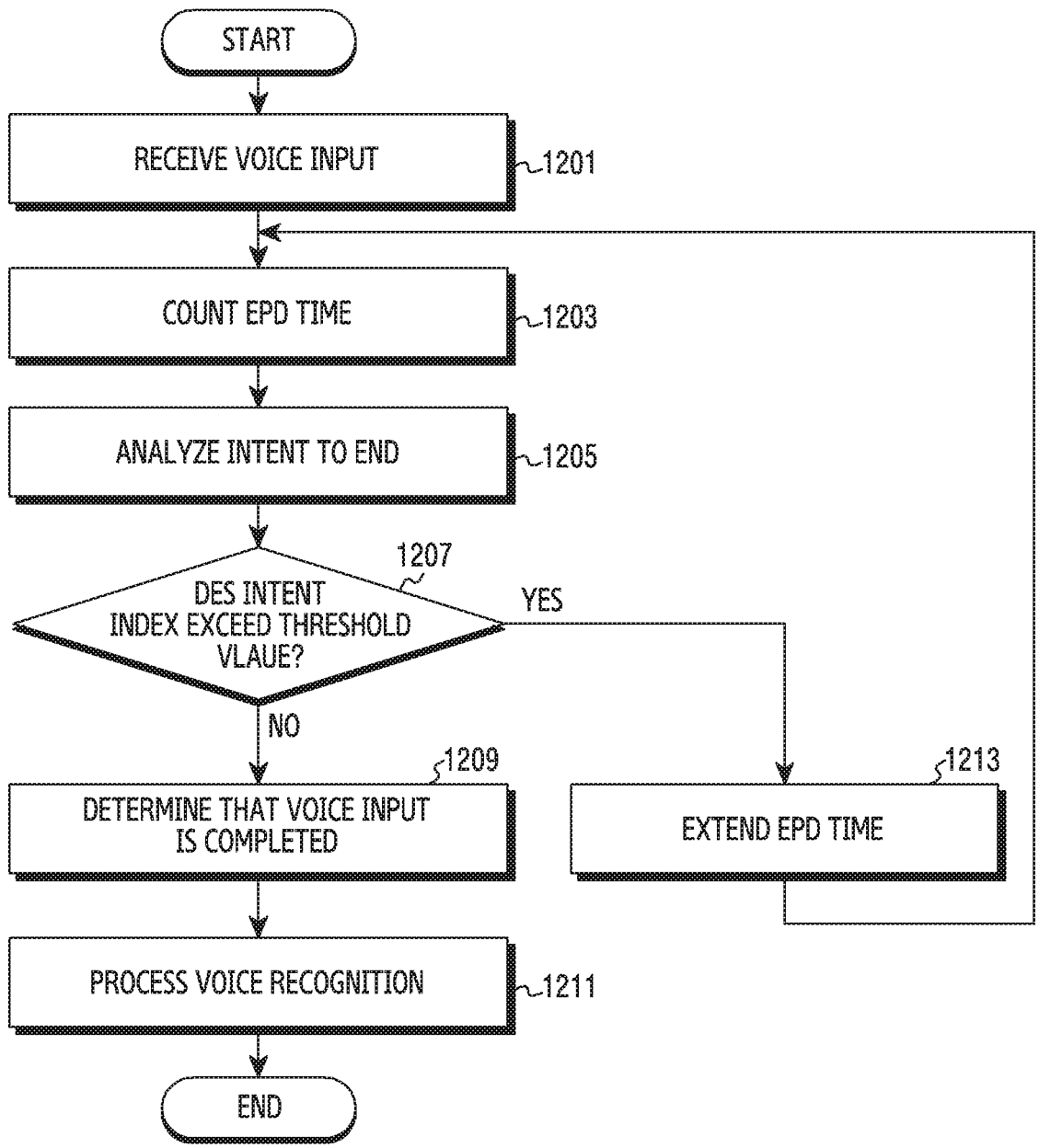
FIG. 12 is a flowchart illustrating a method for sensing an end of speech by using a user's intent to end according to various embodiments.

FIG. 12 is a flowchart illustrating a method for sensing an end of speech using a user's intent to end according to various embodiments.

Referring to FIG. 12, in operation 1201, the electronic device 400 (for example, the processor 410) may receive a voice input. The processor 410 (for example, the voice recognition unit 411) may detect whether a sound is inputted from the microphone 420. Operation 1201 is similar to or the same as operation 501 of FIG. 5A and thus a detailed description thereof is omitted.

In operation 1203, the electronic device 400 (for example, the processor 410) may count an EPD time. For example, the EPD time may be a waiting time for determining that a voice input is ended, and may indicate an input waiting time or a microphone recording waiting time. Operation 1203 is similar to or the same as operation 503 of FIG. 5A and thus a detailed description thereof is omitted.

In operation 1205, the electronic device 400 (for example, the processor 410) may analyze a user's intent to end speech (or an intent to continue speech). For example, the processor 410 may analyze a user's intent to end speech, based on at least one of context information of the electronic device 400, characteristic information of the user, whether an additional voice input is detected, whether a predetermined word is detected, whether a predetermined gesture is detected, or whether a sentence is completed. For example, the electronic device 400 may determine the EPD time based on context information of the electronic device 400 or characteristic information of the user, and may determine that the user has an intent to continue speech (for example, there is no intent to end speech) when at least one of the additional voice input, the predetermined word, the predetermined gesture, or the incomplete sentence is detected within the EPD time.

The processor 410 according to various embodiments may give a different point to at least one of a silence detection time, whether the predetermined word is detected, whether the predetermined gesture is detected, or whether the sentence is completed. The processor 410 according to various embodiments may give a different weight value to at least one element of the silence detection time, whether the predetermined word is detected, whether the predetermined gesture is detected, or whether the sentence is completed, and may calculate the total point.

TABLE 3

| | Sound | Verbal elements | | | | Non-verbal elements | |
|---|---|---|---|---|---|---|---|
| Elements | Silence time | Empty word | Conjunction | Waiting instruction | Completion of sentence | Eyes | Hand gesture |
| | Weight A | Weight B | Weight C | Weight D | Weight E | Weight F | Weight G |
| Signals | 7 sec. | Detected | N/A | N/A | Completed | Right Upper | Moving |
| Points | 2 points | 4 points | 0 point | 0 point | 1 point | 4 points | 4 points |

Referring to table 3, the processor 410 may give a higher point as the silence detection time for which no sound is inputted increases. When the predetermined language (for example, an empty word, a conjunction, a waiting instruction) is detected, the processor 410 may give a set point (for example, 4 points). When the predetermined languages are redundantly detected (for example, an empty word is detected and a conjunction is detected), the processor 410 may give points respectively. When the sentence is completed, the processor 410 may give a first point (for example, 1 point), and, when the sentence is not completed, the processor 410 may give a second point (for example, four points). When the predetermined gesture is detected, the processor 410 may give a set point (for example, four points). When different set gestures are doubly detected, the processor 410 may give points respectively. The processor 410 may calculate a user's intent index related to an end of speech by multiplying the respectively give points by weight values.

In operation 1207, the electronic device 400 (for example, the processor 410) may determine whether the intent index exceeds a threshold value (for example, 3 points). As the intent index is higher, the processor 410 may determine that there is no intent to end (for example, there is an intent to continue speech), and, as the intent index is lower, the processor 410 may determine that there is an intent to end (for example, there is an intent to end speech). Alternatively, the reverse is possible.

When the intent index exceeds the threshold value, the processor 410 may perform operation 1213, and, when the intent index does not exceed the threshold value, the processor 410 may perform operation 1209.

In operation 1213, the electronic device 400 (for example, the processor 410) may extend the EPD time. The processor 410 according to various embodiments may change an EPD extension time based on the intent index. For example, as the intent index is higher, the processor 410 may set the EPD extension time to be longer (for example, 5 seconds), and, as the intent index is lower, the processor 410 may set the EPD extension time to be shorter (for example, 3 seconds). Alternatively, the processor 410 may fix the EPD extension time regardless of the intent index.

When the intent index does not exceed the threshold value, the electronic device 400 (for example, the processor 410) may determine that the voice input is completed in operation 1209. For example, when the EPD time expires and the intent index is low (for example, the intent to continue speech is low), the processor 410 (for example, the voice recognition unit 411) may determine that the user has an intent to end the voice input. Operation 1209 is similar to or the same as operation 509 of FIG. 5A and thus a detailed description thereof is omitted.

In operation 1211, the electronic device 400 (for example, the processor 410) may process voice recognition. The processor 400 (for example, the voice recognition unit 411) may provide a service according to the user's voice input. Operation 1211 is similar to or the same as operation 511 of FIG. 5A, and thus a detailed description thereof is omitted.

Figure 13:
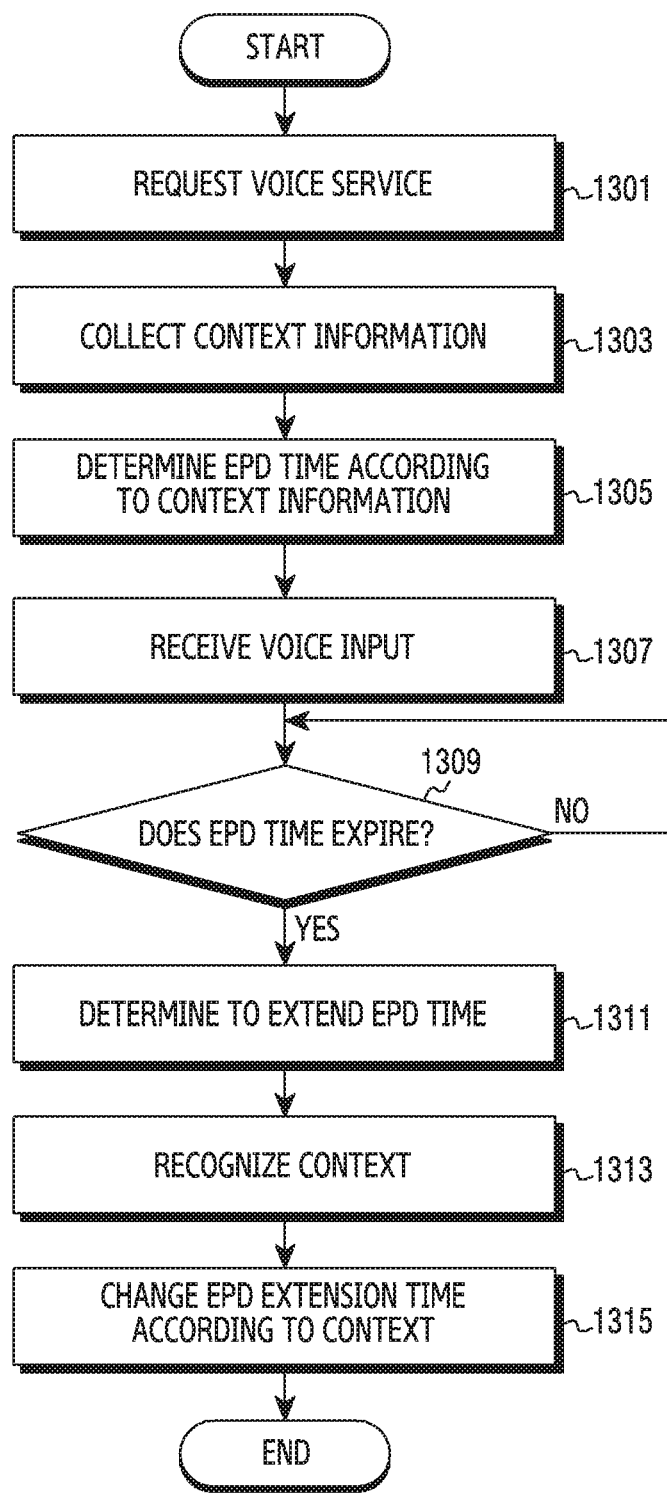
FIG. 13 is a flowchart illustrating a method for controlling an EPD time according to context information according to various embodiments.

FIG. 13 is a flowchart illustrating a method for controlling an EPD time according to context information according to various embodiments.

Referring to FIG. 13, in operation 1301, the electronic device 400 (for example, the processor 410) may receive a request for a voice service. The voice service request may be generated by the user. The user may request the voice service when a specific application is being executed, a home screen is displayed, or when the display 460 is turned off. For example, when a voice invoking instruction is detected, a specific button is selected, a specific function (for example, a voice recognition function) is selected by the user, or a specific gesture/face/eyes are detected, the processor 410 may determine that the voice service is requested.

In operation 1303, the electronic device 400 (for example, the processor 410) may collect (or obtain) context information. The contest information may refer to state information of the electronic device 400. The processor 410 may analyze, collect, or obtain the context information of the electronic device 400 at the time when the voice service is requested. For example, the processor 410 may identify at least one of an application being executed, a display state of the display 460, and a network state of the communication unit 440 at the time when the voice service is requested.

In operation 1305, the electronic device 400 (for example, the processor 410) may determine (or set) an EPD time according to the context information. The EPD time is for determining an end of user's speech, and may be short or long according to the context information.

Table 4 shows an EPD time according to each category and each element.

TABLE 4

| Categories | Elements | EPD time |
|---|---|---|
| Interaction method | Touch Wake-up (Basic) | Medium |
| | Voice Wake-up | Medium |
| | Push to Talk | No EPD until release |
| Function domain | Message, Schedule | Long |
| | Calling, turning on lamp | Short |
| | Shopping list, Music control | No EPD until user says "that's it" or "over" |
| Dialogue steps | Dialogue start step (for example, "Send a message!") | Short |
| | Follow-up asking step (for example, "Who should I send the message?") | Medium |
| | Dictation step (for example, "Enter the text.") | Long |
| Individual users | User A | Long |
| | User B | Medium |
| | User C | Short |

Referring to FIG. 4, the processor 410 may set or may not set an EPD time according to an interaction method by which the voice service is requested. Alternatively, the processor 410 may set an EPD time for a somewhat complex voice command (or application, function), such as a message, a schedule (or calendar), etc., to be long, may set an EPD time for a simple voice command such as calling, turning on a lamp, etc. to be short, and, with respect to a voice command requiring continuous input reception such as a shopping list, music control, etc., may not set an EPD time or may set an EPD time to be longer than for the complex voice command. In addition, the processor 410 may set a different EPD time according to a dialogue stage or personal characteristics. For example, since a speech rate varies by user, the processor 410 may adjust the EPD time to be long or short by considering user's speech rate.

In operation 1307, the electronic device 400 (for example, the processor 410) may receive a voice input. The processor 410 (for example, the voice recognition unit 411) may detect whether a sound is inputted from the microphone 420. Operation 1307 is similar to or the same as operation 501 of FIG. 5A, and thus a detailed description thereof is omitted.

In operation 1309, the electronic device 400 (for example, the processor 410) may determine whether the EPD time expires. When a voice input is received, the processor 410 may count the EPD time determined in operation 1305, and may determine whether the counted EPD time expires.

When the EPD time expires, the processor 410 may perform operation 1311, and, when the EPD time does not expire, the processor 410 may perform operation 1309.

When the EPD time expires, the electronic device 400 (for example, the processor 410) may determine to extend the EPD time in operation 1311. For example, the processor 410 may determine whether the user's speech is ended in various methods included in the above-described flowcharts, and may determine to extend the EPD time as a result of determination.

In operation 1313, the electronic device 400 (for example, the processor 410) may recognize a current context. The current context information may be the same as or different from the context information obtained in operation 1303. The processor 410 may recognize the current context information once again before extending the EPD time.

In operation 1315, the electronic device 400 (for example, the processor 410) may change an EPD extension time according to the context. The EPD extension time may be short or long according to the context information in the same or similar way as or to that of the EPD time. For example, the processor 410 may set an EPD extension time (for example, 3 seconds) when a message recipient is inputted, and an EPD extension time (for example, 10 seconds) when a message content is inputted to be different from each other. That is, the EPD extension time may be different according to the current context even when the same message application is executed.

Figure 14:
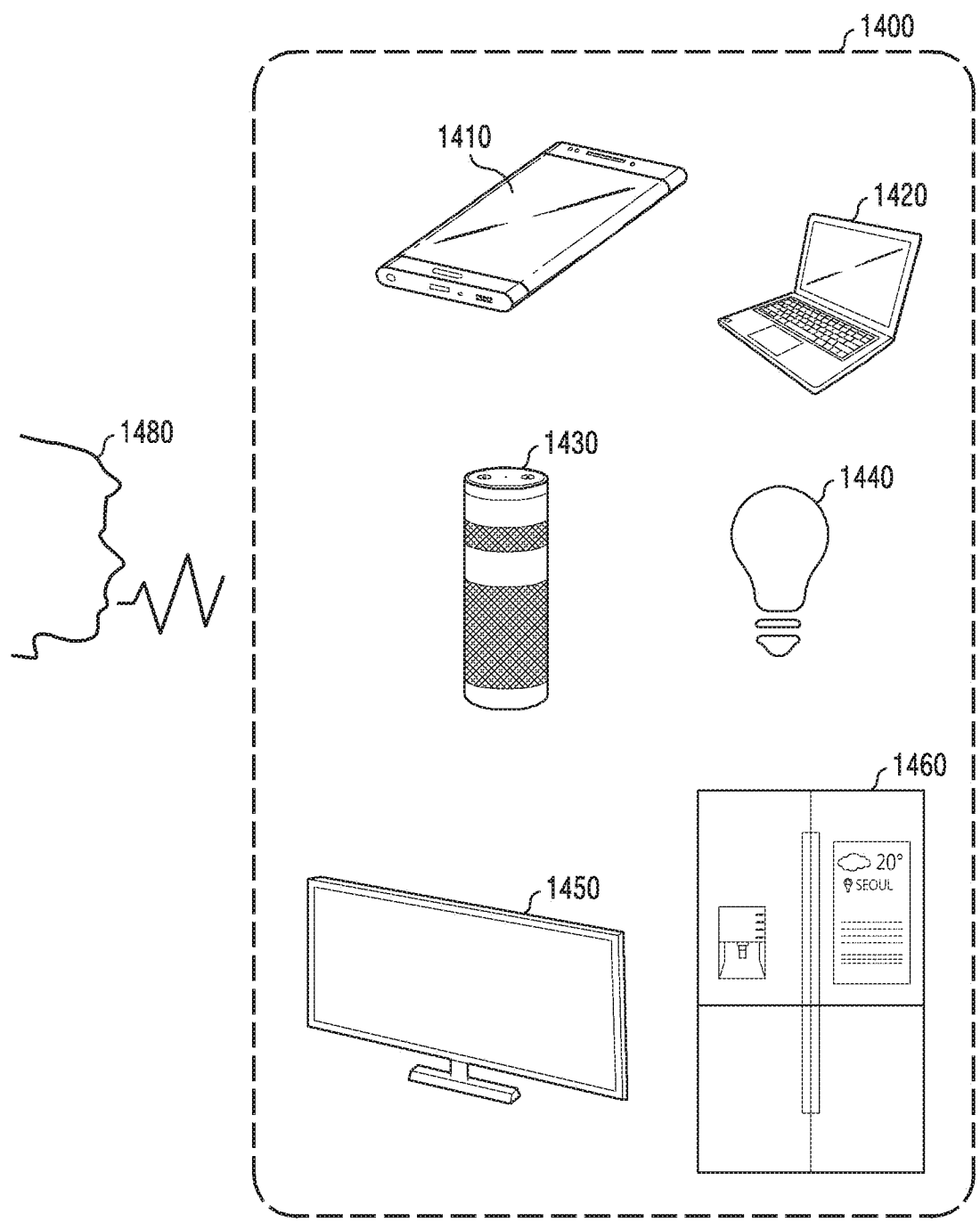
FIG. 14 is a view illustrating examples of electronic devices according to various embodiments.

FIG. 14 is a view illustrating example of electronic devices according to various embodiments.

Referring to FIG. 14, in various embodiments, an electronic device 1400 may include various devices including elements related to voice recognition and a microphone. In various embodiments, the electronic device 1400 may include various types of devices capable of receiving a voice spoken by a user through a microphone and providing a voice recognition service. For example, the electronic device 1400 may include a smartphone 1410, a computer 1420 (for example, a personal computer, a notebook, etc.), a Bluetooth speaker 1430, an internet of things (IoT) device 1440, a television 1450, or a refrigerator 1460. The electronic device 1400 and a voice recognition service method thereof according to various embodiments may be implemented by various devices, such as a tablet PC, an auto infotainment device, a washing machine, an air conditioner, etc. in addition to the above-described configurations.

According to various embodiments, the electronic devices 1410, 1420, 1430, 1440, 1450, 1460 may include their respective domain lists that can be performed. For example, the electronic devices 1410, 1420, 1430, 1440, 1450, 1460 may set domain lists based on functions that the devices can perform. In various embodiments, the domain may indicate a function or task that can be performed by each device 1410, 1420, 1430, 1440, 1450, 1460 by using the voice recognition service. According to an embodiment, in the case of a phone, a domain including calling, a message, music, etc. may be set. According to an embodiment, in the case of a TV, a domain including a channel, a volume, music, etc. may be set. According to an embodiment, in the case of a refrigerator, a domain including a recipe, temperature control, weather, etc. may be set.

Table 5 shows ideas which are applicable to each domain related to a device.

TABLE 5

| Devices | Domains | Examples of speech | Applicable ideas |
|---|---|---|---|
| Phone | Sharing content | "Send this photo . . . um . . . to my mom." | Detecting a common empty word |
| | Message | "After a while, send the message I will be about . . . 10 minutes late." | Detecting a personal empty word |
| | Schedule | "Arrange a meeting at 1 o'clock tomorrow, and arrange a meeting at 10 o'clock in the morning the day after tomorrow." | Detecting a conjunction |
| | Restaurant reservation | Agent: "How many people will you need the reservation for?" User: (thinking while looking up and to the right) "There will be five . . . no . . . six!" | Detecting eyes |
| | . . . | . . . | . . . |
| TV | Searching a content | "Search the action movie . . . umm, what was it? that . . . starring Brad Pitt." | Detecting an empty word and a conjunctive adverb |
| | . . . | . . . | . . . |
| Refrigerator | Buying food ingredients | "Order onion, and also, three potatoes, and also . . . .one apple" (making a hand gesture) | Detecting a gesture and a conjunctive adverb |
| | . . . | . . . | . . . |
| Speaker | Search music | "Play the album of Radiohead . . . what is it? . . . uh . . . the album having creep." | Detecting an empty |
| | . . . | . . . | . . . |
| . . . | . . . | . . . | . . . |

Referring to FIG. 14, the electronic devices 1410, 1420, 1430, 1440, 1450, 1460 may analyze a speech pattern in each domain, and may set a different language or method for determining user's intent to end speech based on the speech pattern. For example, the smartphone 1410 may include a speech pattern according to a domain (for example, sharing a content, a message, schedule, restaurant reservation, etc.), and may set a different language or method for determining a user's intent to end speech based on the speech pattern. For example, in the case of a voice command related sending of a message, the smartphone 1410 may determine whether an empty word is included in the voice information. In the case of a voice command related to schedule, the smartphone 1410 may determine whether the voice information includes a conjunction. To this end, a user's intent to end speech can be more exactly determined. In the case of a voice command related to restaurant reservation, the smartphone 1410 may detect eyes among user's gestures, and, by determining whether the user's eyes correspond to a predetermined gesture, can more exactly determine a user's intent to end speech.

According to various embodiments, an operation method of an electronic device may include: counting an EPD time based on a voice input; when the EPD time expires, determining whether a last word of the voice input corresponds to a predetermined word stored in a memory; and, when the last word corresponds to the predetermined word, extending the EPD time and waiting for reception of a voice input.

The predetermined word may include a common word and a personal word, and the method may further include: determining similarity between a voice command recognized after a voice command failure and a previous voice command; and collecting the personal word based on a degree of the similarity.

The collecting may include analyzing changed text information between the voice command and the previous voice command, and, when the changed text information is detected a predetermined number of times or more, updating the text information with the personal word.

The method may further include determining whether a predetermined gesture is detected when the EPD time expires, and, when the predetermined gesture is detected, extending the EPD time.

The method may further include determining whether a sentence according to the voice input is completed when the EPD time expires, and, when it is determined that the sentence is not completed, extending the EPD time.

The method may further include determining the EPD time or an EPD extension time, based on context information of the electronic device and characteristic information of a user.

The method may further include analyzing a user's intent to end a speech based on at least one of context information of the electronic device, characteristic information of a user, whether an additional voice input is detected, whether a predetermined word is detected, whether a predetermined gesture is detected, or whether a sentence is completed.

A computer readable recording medium according to various embodiments may include a program for executing the operations of: counting an EPD time based on a voice input; when the EPD time expires, determining whether a last word of the voice input corresponds to a predetermined word stored in a memory; and, when the last word corresponds to the predetermined word, extending the EPD time and waiting for reception of a voice input.

A computer-readable recording medium nay include a hard disk, a floppy disk, magnetic media (for example, a magnetic tape), optical media (for example, compact disc read only, memory (CD-ROM) and a digital versatile disc (DVD), magneto-optical media (for example, a floptical disk)), or an internal memory. Also, an instruction may include a code generated by a compiler or a code executable by an interpreter. A module or program module according to various embodiments may include one or more of the above-described elements, some element may be omitted, or other element(s) may further be included. According to various embodiments, operations performed by the module, the program, or another component may be carried out sequentially, in parallel, repeatedly, or heuristically, or one or more of the operations may be executed in a different order or omitted, or one or more other operations may be added.

In addition, the embodiments disclosed in the disclosure and the drawings are suggested for easy explanation and understanding of the disclosed technical features, and are not intended to limit the scope of the disclosure. Therefore, the scope of the disclosure should be interpreted as including all changes or modified forms derived based on the technical idea of the disclosure, in addition to the embodiments disclosed herein.

What is claimed is:

1. An electronic device comprising:
a microphone;
a camera or sensor arranged to detect a user's gesture;
a memory; and
a processor functionally connected with the microphone or the memory,
wherein the processor is configured to:
count an end point detection (EPD) time based on receiving a voice input,
determine whether a last word of the voice input corresponds to a predetermined word stored in the memory and a predetermined gesture is detected by the camera or sensor when the EPD time expires,
extend the EPD time after the reception of the voice input when the last word corresponds to the predetermined word and the predetermined gesture is detected, and
provide a service based on text converted from the voice input, wherein the processor is further configured to:
analyze a user's intent to end a speech in a method of calculating an index related to the user's intent to end the speech by giving a weight value or a point to whether the predetermined word is detected and whether the predetermined gesture is detected,
set an EPD extension time to a first time when the index is a first index and set the EPD extension time to a second time longer than the first time when the index is a second index higher than the first index, and
when the index is greater than or equal to a predetermined index, extend the EPD time based on the EPD extension time, and
wherein the predetermined gesture includes a specific gesture for a word that will be used to speak.

2. The electronic device of claim 1, wherein the processor is further configured to, when the last word corresponds to a predetermined word comprising at least one of an empty word, a conjunction, or a waiting instruction, extend the EPD time.

3. The electronic device of claim 1, wherein the processor is further configured to, when an additional voice input is detected before the EPD time expires, extend the EPD time.

4. The electronic device of claim 1,
wherein the predetermined word comprises a common word and a personal word, and
wherein the processor is further configured to:
determine similarity between a voice command recognized after a voice command failure and a previous voice command, and
collect the personal word based on a degree of the similarity.

5. The electronic device of claim 4, wherein the processor is further configured to:
analyze changed text information between the voice command and the previous voice command, and
when the changed text information is detected a predetermined number of times or more, update the text information with the personal word.

6. The electronic device of claim 1, wherein the processor is further configured to:
determine whether a sentence according to the voice input is completed when the EPD time expires, and
when it is determined that the sentence is not completed, extend the EPD time.

7. The electronic device of claim 6, wherein the processor is further configured to determine whether to perform an operation of determining whether the sentence is completed, based on a type of a voice command according to the voice input.

8. The electronic device of claim 1, wherein the processor is further configured to:
extend the EPD time according to a fixed value, or to change the EPD time to a value corresponding to context recognition, and
extend the EPD time according to the changed value.

9. The electronic device of claim 1, wherein the processor is further configured to determine the EPD time or the EPD extension time, based on context information of the electronic device and characteristic information of the user.

10. The electronic device of claim 1, wherein the processor is further configured to analyze the user's intent to end the speech based on at least one of context information of the electronic device, characteristic information of the user, whether an additional voice input is detected, or whether a sentence is completed.

11. The electronic device of claim 10, wherein the processor is further configured to:
calculate the index related to the user's intent to end the speech by giving the weight value or the point to at least one of a silence detection time, or whether the sentence is completed.

12. The electronic device of claim 1, wherein the service comprises mobile search, schedule management, calling, memo, and music play.

13. An operation method of an electronic device, the method comprising:
counting, by a processor of the electronic device, an end point detection (EPD) time, based on receiving a voice input through a microphone of the electronic device;
when the EPD time expires, determining, by the processor, whether a last word of the voice input corresponds to a predetermined word stored in a memory of the electronic device and a predetermined gesture is detected by a camera or sensor of the electronic device;

when the last word corresponds to the predetermined word and the predetermined gesture is detected, extending, by the processor, the EPD time after the reception of the voice input; and providing, by the processor, a service based on text converted from the voice input, wherein the method further comprises:
- analyzing, by the processor, a user's intent to end a speech in a method of calculating an index related to the user's intent to end the speech by giving a weight value or a point to whether the predetermined word is detected and whether the predetermined gesture is detected,
- setting, by the processor, an EPD extension time to a first time when the index is a first index and setting, by the processor, the EPD extension time to a second time longer than the first time when the index is a second index higher than the first index, and
- when the index is greater than or equal to a predetermined index, extending, by the processor, the EPD time based on the EPD extension time, and wherein the predetermined gesture includes a specific gesture for a word that will be used to speak.

14. The method of claim 13, wherein the predetermined word comprises a common word and a personal word, and wherein the method further comprises:
- determining, by the processor, similarity between a voice command recognized after a voice command failure and a previous voice command; and
- collecting, by the processor, the personal word based on a degree of the similarity.

15. The method of claim 14, wherein collecting comprises:
- analyzing, by the processor, changed text information between the voice command and the previous voice command; and
- when the changed text information is detected a predetermined number of times or more, updating, by the processor, the text information with the personal word.

16. The method of claim 13, further comprising:
- when the EPD time expires, determining, by the processor, whether a sentence according to the voice input is completed; and
- when it is determined that the sentence is not completed, extending, by the processor, the EPD time.

17. The method of claim 13, further comprising determining, by the processor, the EPD time or the EPD extension time, based on context information of the electronic device and characteristic information of a user.

18. The method of claim 13, further comprising analyzing, by the processor, the user's intent to end the speech based on at least one of context information of the electronic device, characteristic information of the user, whether an additional voice input is detected, or whether a sentence is completed.

* * * * *